United States Patent
Tao et al.

(10) Patent No.: US 11,394,431 B2
(45) Date of Patent: Jul. 19, 2022

(54) INTER-CELL COORDINATED SCHEDULING METHOD, APPARATUS AND DEVICE

(71) Applicant: Huawei Technologies Co., Ltd., Shenzhen (CN)

(72) Inventors: Maozhi Tao, Dongguan (CN); Dagang Zhang, Dongguan (CN); Shengfeng Jiang, Dongguan (CN); Ruyang Lin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 235 days.

(21) Appl. No.: 16/883,726

(22) Filed: May 26, 2020

(65) Prior Publication Data
US 2020/0287599 A1   Sep. 10, 2020

Related U.S. Application Data

(63) Continuation of application No. PCT/CN2017/113095, filed on Nov. 27, 2017.

(51) Int. Cl.
| | |
|---|---|
| *H04W 4/00* | (2018.01) |
| *H04B 7/024* | (2017.01) |
| *H04B 7/06* | (2006.01) |
| *H04L 5/00* | (2006.01) |

(Continued)

(52) U.S. Cl.
CPC ........... *H04B 7/024* (2013.01); *H04B 7/0632* (2013.01); *H04L 5/0035* (2013.01); *H04L 5/0082* (2013.01); *H04W 28/26* (2013.01); *H04W 72/1278* (2013.01)

(58) Field of Classification Search
None
See application file for complete search history.

(56) References Cited

U.S. PATENT DOCUMENTS

| | | | |
|---|---|---|---|
| 2013/0121186 A1* | 5/2013 | Vajapeyam | ......... H04W 72/085 370/252 |
| 2014/0133325 A1* | 5/2014 | Prasad | .................. H04L 1/0026 370/252 |

(Continued)

FOREIGN PATENT DOCUMENTS

| | | |
|---|---|---|
| CN | 101754383 A | 6/2010 |
| CN | 102905285 A | 1/2013 |

(Continued)

OTHER PUBLICATIONS

NSN, "Signaling framework for inter-eNB CoMP", 3GPP TSG-RAN WG3 Meeting #84, R3-141183, Seoul, Korea, May 19-23, 2014, 8 pages.

*Primary Examiner* — Phirin Sam
(74) *Attorney, Agent, or Firm* — Slater Matsil, LLP

(57) ABSTRACT

A method includes: receiving, by a first network control device, CoMP pre-scheduling requests respectively corresponding to at least one edge cell and a first edge cell that is adjacent to the at least one edge cell and that belongs to another CoMP cluster; when determining, based on the CoMP pre-scheduling requests, that the at least one edge cell has a second edge cell meeting a preset condition with the first edge cell, sending an inter-cluster pre-scheduling request to a second network control device; and instructing the second network control device to assign a first coordination cell set including the first edge cell and the second edge cell.

20 Claims, 7 Drawing Sheets

(51) Int. Cl.
*H04W 28/26* (2009.01)
*H04W 72/12* (2009.01)

(56) References Cited

U.S. PATENT DOCUMENTS

| | | | | |
|---|---|---|---|---|
| 2015/0358982 A1* | 12/2015 | Jeon | ............... | H04J 11/005 |
| | | | | 370/252 |
| 2015/0358989 A1* | 12/2015 | Ni | ............... | H04W 72/082 |
| | | | | 370/330 |
| 2016/0037511 A1* | 2/2016 | Vincze | ............ | H04W 72/0426 |
| | | | | 370/329 |
| 2016/0270115 A1* | 9/2016 | Mukkavilli | .......... | H04L 5/1469 |
| 2018/0115398 A1* | 4/2018 | Su | ................... | H04L 5/0035 |

FOREIGN PATENT DOCUMENTS

| | | |
|---|---|---|
| CN | 104363601 A | 2/2015 |
| CN | 104918256 A | 9/2015 |
| CN | 105323766 A | 2/2016 |
| EP | 2590450 A1 | 5/2013 |
| EP | 2809106 A1 | 12/2014 |
| EP | 3117644 A1 | 1/2017 |
| WO | 2012051878 A1 | 4/2012 |

\* cited by examiner

INTER-CELL COORDINATED SCHEDULING METHOD, APPARATUS AND DEVICE

CROSS-REFERENCE TO RELATED APPLICATIONS

This application is a continuation of International Application No. PCT/CN2017/113095, filed on Nov. 27, 2017, the disclosure of which is hereby incorporated by reference in its entirety.

TECHNICAL FIELD

This application relates to the field of wireless communications technologies, and in particular, to an inter-cell coordinated scheduling method, an apparatus, and a device.

BACKGROUND

Coordinated multiple points (CoMP) is a technology in which a plurality of cells coordinately participate in transmitting data to a terminal or jointly receive data sent by a terminal. CoMP reduces inter-cell interference and improves spectral efficiency of a cell edge user.

In the related art, a plurality of cells (usually cells controlled by a same base station) in a same transmission networking environment may be grouped into one CoMP cluster in advance. Execution bodies of the CoMP may include a cluster management module and a coordinated scheduling module, where the cluster management module further assigns the CoMP cluster into a plurality of coordination cell sets based on a neighbor relationship between cells and a cell load status in the CoMP cluster; and the coordinated scheduling module performs CoMP pre-scheduling on each cell in each coordination cell set, and sends a CoMP pre-scheduling result to a corresponding cell, then the corresponding cell performs real scheduling based on the CoMP pre-scheduling result.

Due to a performance limitation of the execution body of the CoMP, cluster management and scheduling cannot be implemented on an entire network, and coordination cell set assigning and coordinated scheduling can be performed only by using the CoMP cluster as a unit. When a user terminal is located in an edge area of an entire CoMP cluster, in the CoMP cluster, there are a relatively small quantity of cells that perform coordinated transmission for the user terminal at the same time, and the cells are easily interfered with by an adjacent cell outside the CoMP cluster. Consequently, an effect of the coordinated transmission is relatively poor.

SUMMARY

To improve an effect of coordinated transmission, embodiments of this application provide an inter-cell coordinated scheduling method, an apparatus, and a method.

According to one aspect, an inter-cell coordinated scheduling method is provided, where the method includes: obtaining, by a first network control device, coordinated multiple points CoMP pre-scheduling requests respectively corresponding to at least one edge cell and a first edge cell, where the at least one edge cell belongs to a CoMP cluster corresponding to the first network control device, the first edge cell is adjacent to the at least one edge cell, and the first edge cell does not belong to the CoMP cluster corresponding to the first network control device; and when the first network control device determines, based on the CoMP pre-scheduling requests respectively corresponding to the at least one edge cell and the first edge cell, that the at least one edge cell has a second edge cell meeting a preset condition with the first edge cell, sending an inter-cluster pre-scheduling request to a second network control device, where the inter-cluster pre-scheduling request is used to instruct the second network control device to assign a first coordination cell set, and the first coordination cell set includes the first edge cell and the second edge cell.

In the foregoing inter-cell coordinated scheduling solution, during a process of performing CoMP scheduling, when the first network control device corresponding to each CoMP cluster determines, based on the CoMP pre-scheduling requests respectively corresponding to an edge cell in the CoMP cluster and an edge cell in another CoMP cluster, that a second edge cell in the CoMP cluster and a first edge cell in the another CoMP cluster meet a condition of being assigned into a same coordination cell set, the second network control device assigns the first edge cell and the second edge cell into a same first coordination cell set, thereby implementing performing the CoMP scheduling between adjacent cells belonging to different CoMP clusters, so that terminals located in edge cells of different CoMP clusters can obtain coordinated transmission services provided by a plurality of cells in different CoMP clusters, thereby avoiding interference of adjacent cells outside the CoMP cluster, and improving the effect of coordinated transmission.

Optionally, the CoMP cluster corresponding to the first network control device includes at least two cells managed by the first network control device when the first network control device performs CoMP pre-scheduling, the at least two cells include the at least one edge cell, and the edge cell is a cell adjacent to a cell in another CoMP cluster other than the CoMP cluster in which the edge cell is located.

Optionally, the CoMP pre-scheduling request includes radio environment information of an accessed terminal in a corresponding cell and weight information of the accessed terminal in the corresponding cell, the radio environment information is used to indicate signal quality that is detected by a corresponding terminal and that is of each surrounding cell, the weight information includes at least one of a current to-be-transmitted data volume and a current scheduling priority; and before the first network control device sends the inter-cluster pre-scheduling request to the second network control device, the method further includes: calculating, by the first network control device based on radio environment information of an accessed terminal in the first edge cell and weight information of the accessed terminal in the first edge cell, a coordination gain brought by adjacent cells of the first edge cell to the first edge cell, where the coordination gain is used to indicate an effect of coordinated transmission performed by one cell on an accessed terminal in another cell; calculating, based on radio environment information of an accessed terminal in the second edge cell and weight information of the accessed terminal in the second edge cell, a coordination gain brought by adjacent cells of the second edge cell to the second edge cell; and when an affinity condition is met between the coordination gain brought by the adjacent cells of the first edge cell to the first edge cell and the coordination gain brought by the adjacent cells of the second edge cell to the second edge cell, determining that the preset condition is met between the first edge cell and the second edge cell.

In the foregoing optional solutions, when it is determined whether the preset condition is met between the first edge cell and the second edge cell, the coordination gain between cells is calculated based on a current to-be-transmitted data volume and/or current scheduling priority of the accessed terminal in each cell, and the effect of the coordinated transmission between two cells that are determined based on the coordination gain and that meet the preset condition is much better, so that a calculation result of the coordination gain better meets a requirement of a CoMP scheduling scenario, thereby further improving the effect of the coordinated transmission.

Optionally, the affinity condition includes: a coordination gain brought by the second edge cell to the first edge cell is greater than the coordination gain brought by adjacent cells in a same cluster of the first edge cell to the first edge cell, and a coordination gain brought by the first edge cell to the second edge cell is greater than the coordination gain brought by adjacent cells in a same cluster of the second edge cell to the second edge cell, where the adjacent cells in the same cluster are adjacent cells in the same CoMP cluster; or, a coordination gain brought by the second edge cell to the first edge cell is greater than a larger value of a first preset gain and the coordination gain brought by adjacent cells in a same cluster of the first edge cell to the first edge cell, and a coordination gain brought by the first edge cell to the second edge cell is greater than a larger value of a second preset gain and the coordination gain brought by adjacent cells in a same cluster of the second edge cell to the second edge cell, where the adjacent cells in the same cluster are adjacent cells in the same CoMP cluster.

In the foregoing optional solutions, when a CoMP scheduling effect that can be achieved by using CoMP inter-cluster coordination cell set assigning is better than a CoMP scheduling effect using coordination cell set assigning in a single CoMP cluster, or when a CoMP scheduling effect that can be achieved by using CoMP inter-cluster coordination cell set assigning is better than a CoMP scheduling effect using coordination cell set assigning in a single CoMP cluster, and in addition, the CoMP scheduling effect that can be achieved by using the CoMP inter-cluster coordination cell set assigning is superior to a preset scheduling effect, two adjacent edge cells that do not belong to the same CoMP cluster are assigned into the same CoMP cluster, thereby avoiding meaningless coordination cell set assigning across the CoMP inter-cluster.

Optionally, before sending the inter-cluster pre-scheduling request to the second network control device, the method further includes: determining, by a first network control device, a first reserved resource, where the first reserved resource is a resource reserved for the first edge cell and the second edge cell to perform scheduling, and when sending the inter-cluster pre-scheduling request to the second network control device, the method includes: sending, by the first network control device, the inter-cluster pre-scheduling request including the first reserved resource to the second network control device.

The foregoing optional solutions provide a method of determining a resource for performing the CoMP pre-scheduling in the coordination cell set across the CoMP clusters.

Optionally, the determining, by a first network control device, a first reserved resource includes: determining, by the first network control device, a start resource location of the first reserved resource based on an identifier of the first edge cell and an identifier of the second edge cell; determining, by the first network control device, a quantity of resources of the first reserved resource based on resource requirement information of an accessed terminal in the first edge cell and resource requirement information of an accessed terminal in the second edge cell; and determining, by the first network control device, the reserved resource based on the start resource location of the first reserved resource and the quantity of resources of the first reserved resource, where the resource requirement information includes at least one of a current to-be-transmitted data volume of a corresponding terminal, a current scheduling priority of the corresponding terminal, and radio environment information of the corresponding terminal.

In the foregoing optional solutions, a resource reserved for an edge cell is determined from the resource corresponding to the edge cell based on the resource requirement information such as the current to-be-transmitted data volume, current scheduling priority, and radio environment information of a terminal in the edge cell, so that the resource reserved for the edge cell meets a requirement of performing the CoMP pre-scheduling by the terminal in the edge cell.

Optionally, the method further includes: receiving, by the first network control device, a resource allocation indication sent by the second network control device, where the resource allocation indication is used to indicate an unused resource other than an actually used resource in the reserved resource, the actually used resource is a resource used by the second network control device when the second network control device performs the CoMP pre-scheduling on each cell in the first coordination cell set; and recycling, by the first network device, the unused resource in the reserved resource based on the resource allocation indication.

According to the foregoing optional solutions, after the second network control device determines the actually used resource in the coordination cell set across the CoMP clusters, the first network control device may recycle the unused resource in the first reserved resource based on a resource determination result of the second network control device, to increase resource utilization.

Optionally, an actually used resource of the edge cell only belongs to a coordination cell set in which the edge cell is located.

Because different CoMP clusters have different networking environments, when an edge cell in one CoMP cluster is assigned into a CoMP inter-cluster coordination cell set, an inter-cell coordinated technology used by the edge cell may be different from a coordinated technology used by another cell in the CoMP cluster. In the foregoing optional solutions, an actually used resource of an edge cell in a CoMP cluster is isolated from an actually used resource of a non-edge cell, to avoid the same resource from being applied to cells using different coordinated technologies, thereby avoiding interference between the cells using different coordinated technologies.

Optionally, the method further includes: assigning, by the first network control device, another cell into at least one second coordination cell set based on a CoMP pre-scheduling request corresponding to another cell different from the second edge cell in the at least two cells; and sending a CoMP pre-scheduling result based on the second coordination cell set.

According to the foregoing optional solutions, for cells that are in a corresponding CoMP cluster and that are not assigned into the CoMP inter-cluster coordination cell set, the first network control device further assigns these cells into a coordination cell set in the CoMP cluster, to implement CoMP pre-scheduling performed on these cells in the CoMP cluster.

Optionally, the assigning, by the first network control device, another cell into at least one second coordination cell set based on a CoMP pre-scheduling request corresponding to another cell different from the second edge cell in the at least two cells; and sending a CoMP pre-scheduling result based on the second coordination cell set includes: assigning, by the first network control device, the another cell into at least one second coordination cell set within a current TTI based on the CoMP pre-scheduling request corresponding to the another cell different from the second edge cell in the at least two cells; and sending the CoMP pre-scheduling result based on the second coordination cell set.

According to the foregoing optional solutions, the first network control device performs coordination cell set assigning and pre-scheduling by using the TTI as a period, to avoid a problem of an inaccurate pre-scheduling result caused by an excessively long period of the coordination cell set assigning, thereby ensuring accuracy of the pre-scheduling result.

Optionally, the radio environment information includes at least one piece of the following information: a channel quality indicator CQI that is detected by a corresponding terminal and that is of each surrounding cell, a signal-to-noise ratio that is detected by the corresponding terminal and that is of each surrounding cell, and a signal strength that is detected by the corresponding terminal and that is of each surrounding cell.

According to another aspect, an inter-cell coordinated scheduling method is provided, where the method includes: receiving, by a second network control device, an inter-cluster pre-scheduling request sent by a first network control device, where the inter-cluster pre-scheduling request is used to instruct to assign a first coordination cell set including a first edge cell and a second edge cell; the second edge cell is a cell in at least one edge cell, the at least one edge cell belongs to a CoMP cluster corresponding to the first network control device, the first edge cell is adjacent to the at least one edge cell, and the first edge cell does not belong to the CoMP cluster corresponding to the first network control device; and assigning, by the second network control device, the first coordination cell set based on the inter-cluster pre-scheduling request, and sending a CoMP pre-scheduling result based on the first coordination cell set.

Optionally, the inter-cluster pre-scheduling request further includes a first reserved resource, the first reserved resource is a resource reserved by the first network control device for the first edge cell and the second edge cell to perform scheduling, and the method further includes: determining, by the second network control device, an actually used resource in the first reserved resource, where the actually used resource is a resource used by the second network control device when the second network control device performs CoMP pre-scheduling on each cell in the first coordination cell set.

Optionally, the determining, by the second network control device, an actually used resource in the first reserved resource includes: determining, by the second network control device, an intersection set of the first reserved resource and a second reserved resource as the actually used resource, where the second reserved resource is a resource reserved by the first network control device corresponding to the first edge cell for the first edge cell and the second edge cell to perform the scheduling.

In the foregoing optional solutions, the second network control device determines, with reference to the first reserved resource of each cell in the coordination cell set across CoMP clusters, a resource that is of CoMP pre-scheduling and that is used in the coordination cell set, so that CoMP resources used by all cells in the same coordination cell set across the CoMP clusters are the same.

Optionally, the method further includes: sending, by the second network control device, a resource allocation indication to the first network control device, where the resource allocation indication is used to indicate an unused resource other than the actually used resource in the reserved resource.

Optionally, the assigning, by the second network control device, the first coordination cell set based on the inter-cluster pre-scheduling request, and sending a CoMP pre-scheduling result based on the first coordination cell set includes: assigning, by the second network control device, the first coordination cell set within a current TTI based on the inter-cluster pre-scheduling request; and sending the CoMP pre-scheduling result based on the first coordination cell set.

According to still another aspect, an inter-cell coordinated scheduling apparatus is provided, where the apparatus has a function implementing the inter-cell coordinated scheduling method provided in the foregoing one aspect and optional implementation solutions of the one aspect. The function may be implemented by using hardware, or may be implemented by hardware executing corresponding software. The hardware or the software includes one or more units corresponding to the foregoing function.

According to still another aspect, an inter-cell coordinated scheduling apparatus is provided, where the apparatus has a function implementing the inter-cell coordinated scheduling method provided in the foregoing another aspect and optional implementation solutions of the another aspect. The function may be implemented by using hardware, or may be implemented by hardware executing corresponding software. The hardware or the software includes one or more units corresponding to the foregoing function.

According to still another aspect, a first network control device is provided, where the device includes: a processor, a communications interface, and a memory, where the processor in the device executes a program or an instruction stored in the memory, to implement the inter-cell coordinated scheduling method provided in the foregoing one aspect and optional implementation solutions of the one aspect.

According to still another aspect, a second network control device is provided, where the device includes: a processor, a communications interface, and a memory, where the processor in the device executes a program or an instruction stored in the memory, to implement the inter-cell coordinated scheduling method provided in the foregoing another aspect and optional implementation solutions of the another aspect.

According to still another aspect, a computer-readable storage medium is provided, where the computer-readable storage medium has an executable program, and the executable program is executed by a processor, to implement the inter-cell coordinated scheduling method provided in the foregoing one aspect and optional implementation solutions of the one aspect.

According to still another aspect, a computer-readable storage medium is provided, where the computer-readable storage medium has an executable program, and the executable program is executed by a processor, to implement the inter-cell coordinated scheduling method provided in the foregoing another aspect and optional implementation solutions of the another aspect.

According to yet another aspect, an inter-cell coordinated scheduling method is provided, where the method includes: receiving, by a network control device, coordinated multiple points CoMP pre-scheduling requests respectively sent by at least two cells; assigning, by the network control device, the at least two cells into at least one coordination cell set within a current TTI based on the CoMP pre-scheduling requests respectively corresponding to the at least two cells; and sending, by the network control device, a CoMP pre-scheduling result within the current TTI based on the coordination cell set.

According to the foregoing optional solutions, the network control device performs CoMP inter-cluster coordination cell set assigning and pre-scheduling by using the TTI as a period, to avoid a problem of an inaccurate pre-scheduling result caused by an excessively long period of the coordination cell set assigning, thereby ensuring accuracy of the pre-scheduling result.

According to another aspect, an inter-cell coordinated scheduling apparatus is provided, where the apparatus has a function implementing the inter-cell coordinated scheduling method provided in the foregoing yet another aspect. The function may be implemented by using hardware, or may be implemented by hardware executing corresponding software. The hardware or the software includes one or more units corresponding to the foregoing function.

According to still another aspect, a first network control device is provided, where the device includes: a processor, a communications interface, and a memory, where the processor in the device executes a program or an instruction stored in the memory, to implement the inter-cell coordinated scheduling method provided in the foregoing yet another aspect.

According to still another aspect, a computer-readable storage medium is provided, where the computer-readable storage medium has an executable program, and the executable program is executed by a processor, to implement the inter-cell coordinated scheduling method provided in the foregoing yet another aspect.

DETAILED DESCRIPTION OF ILLUSTRATIVE EMBODIMENTS

To make objectives, technical solutions, and advantages of this application clearer, the following further describes implementations of this application in detail with reference to accompanying drawings.

Solutions shown in embodiments of this application may be applied to a wireless communications system, for example, solutions shown in embodiments of this application may be applied to the 4th generation mobile communications system (4G), also referred to as a Long Term Evolution (LTE) system; or, solutions shown in embodiments of this application may be applied to a 5th generation (5G) mobile communications system, also referred to as a new radio (NR) system; or, solutions shown in embodiments of this application may further be applied to a next-generation mobile communications system after the 5G.

Figure 1:
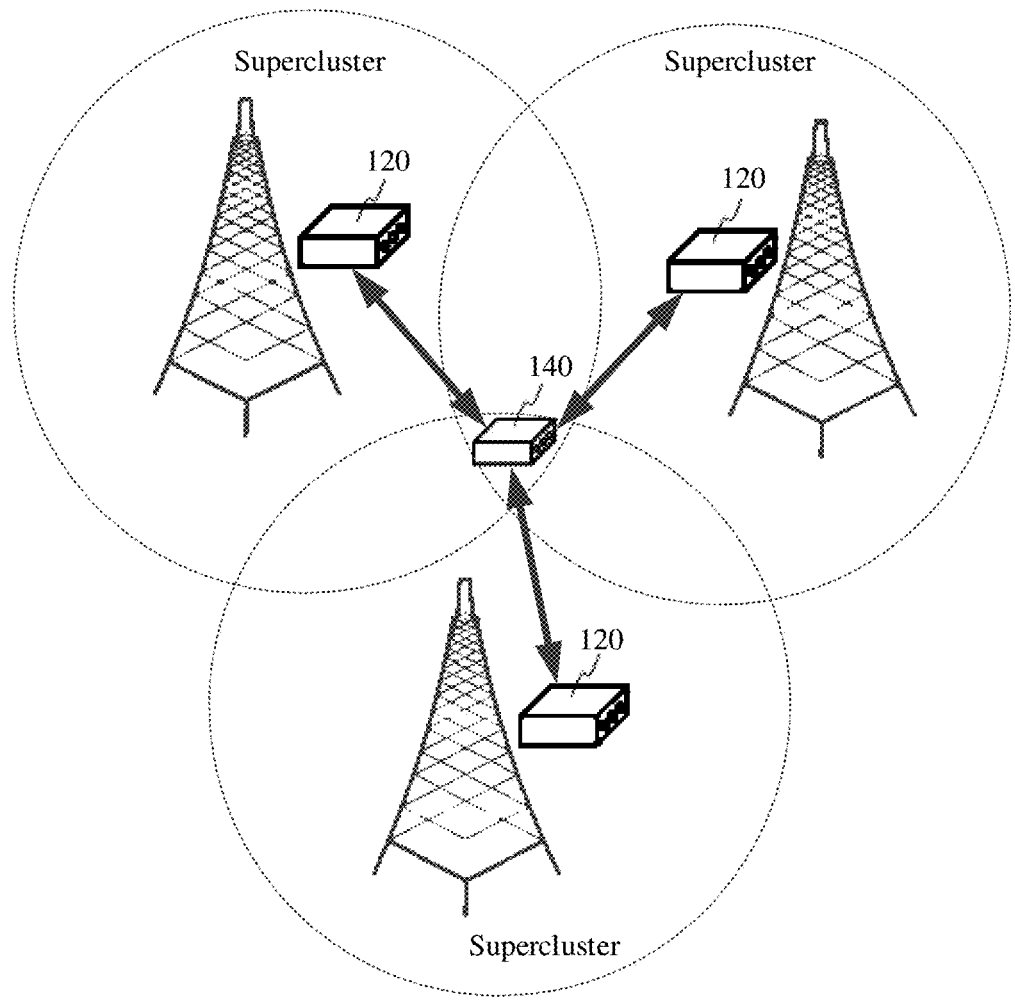
FIG. 1 is an architectural diagram of an inter-cell coordinated scheduling system according to this application.

FIG. 1 is an architectural diagram of an inter-cell coordinated scheduling system according to an embodiment of this application. The inter-cell coordinated scheduling system may include the following devices: at least two first network control devices 120 and a second network control device 140.

Each first network control device 120 corresponds to one CoMP cluster, and each CoMP cluster is a cell set formed by at least two cells. For ease of management, usually, one CoMP cluster may be formed by several cells that are managed by one base station or a plurality of adjacent base stations and that have a same networking environment. In other words, in this embodiment of this application, one CoMP cluster is formed by at least two cells managed by a corresponding first network control device when the corresponding first network control device performs CoMP pre-scheduling.

The foregoing first network control device 120 may be disposed on a base station in which the cell in the CoMP cluster is located; or, the first network control device 120 may further be disposed outside the base station in which the cell in the CoMP cluster is located.

The second network control device 140 may be disposed independent of each first network control device 120, for example, the second network control device 140 and one of the first network control devices 120 may be disposed on different processing boards of a same base station, or, the second network control device 140 may also be disposed in an independent equipment room outside the base station in which each first network control device 120 is located. Alternatively, the second network control device 140 and one of the at least two first network control devices 120 may be disposed in a centralized manner, for example, the second network control device 140 and one of the first network control devices 120 may be disposed on a same processing board of a same base station, and the second network control device 140 and the first network control device 120 share a computing resource and a storage resource that are of the same processing board. The processing board is also referred to as a single board computer, is a computer device assembling all components onto a print circuit board, may include a microprocessor, a memory, an input output interface, and the like, and may further include other external devices such as a simple light-emitting diode display, a small keyboard, and a socket.

When the second network control device 140 is disposed independent of each first network control devices 120, the first network control device 120 is connected to the second network control device 140 in a wired manner, for example, the first network control device 120 may be connected to the second network control device 140 by using an Ethernet optical interface, an Ethernet point interface, or a bus interface. This application does not limit a connection manner between the first network control device 120 and the second network control device 140.

In an application, some cells in one CoMP cluster may be adjacent to cells in other CoMP clusters, and these cells that are in one CoMP cluster and that are adjacent to the cells in the other CoMP clusters may be referred to as edge cells in the CoMP cluster. In this embodiment of this application, in addition to communicating with each cell in the CoMP cluster, the first network control device 120 corresponding to one CoMP cluster may further communicate with an edge cell in another CoMP cluster.

For example, a CoMP cluster a includes an edge cell a1, a CoMP cluster b includes an edge cell b1, and the edge cell a1 is adjacent to the edge cell b1. In this case, the first network control device 120 corresponding to the CoMP cluster a may communicate with each cell in the CoMP cluster a and the edge cell b1, and the first network control device 120 corresponding to the CoMP cluster b may further communicate with each cell in the CoMP cluster b and the edge cell a1.

The foregoing first network control device 120 may be implemented based on the processing board in the base station, and the processing board is connected to a baseband board in the base station, to implement communicating with a cell that runs based on the baseband board. For example, FIG. 2 is a schematic diagram of a deployment of a network control device according to an embodiment of this application.

Figure 2:
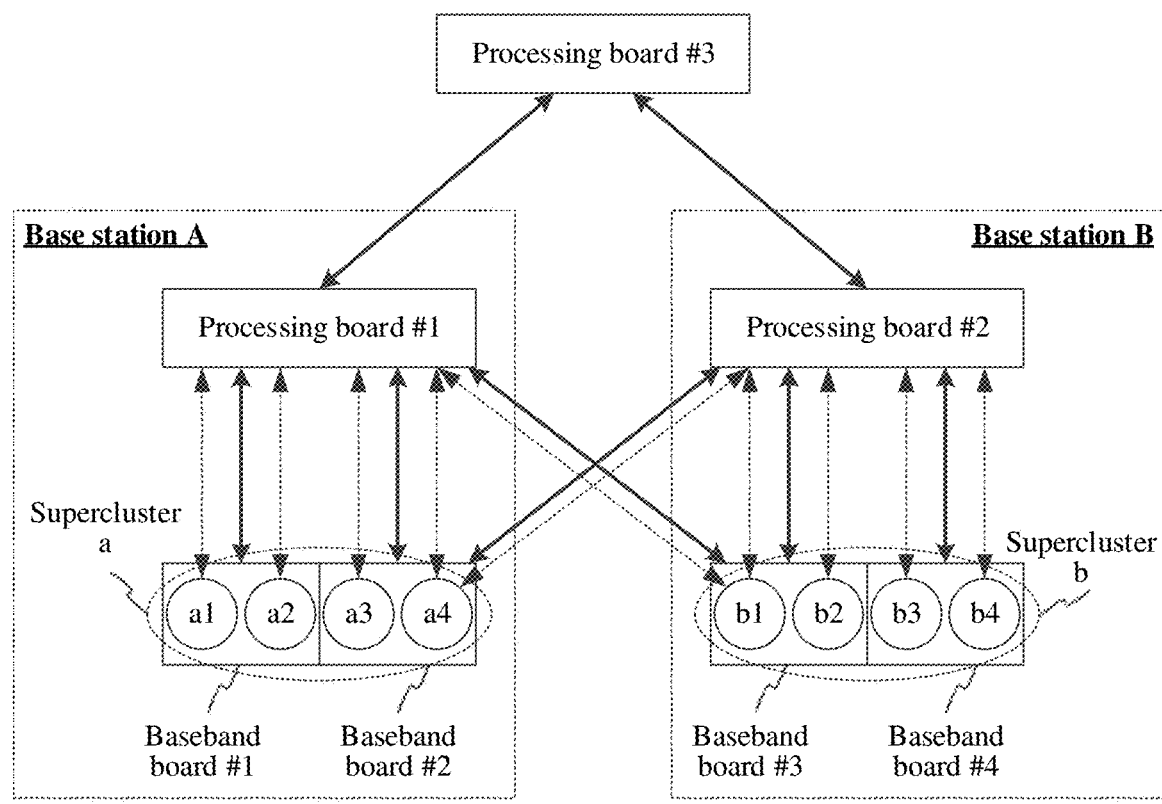
FIG. 2 is a schematic diagram of a deployment of a network control device according to an embodiment shown in FIG. 1.

As shown in FIG. 2, cells in a base station A form a CoMP cluster a, cells in a base station B form a CoMP cluster b. A processing board #1 is a first network control device corresponding to the CoMP cluster a, and a processing board #2 is a first network control device corresponding to the CoMP cluster b. The CoMP cluster a includes four cells. FIG. 2 shows a cell a1 and a cell a2 that run based on a baseband board #1, and a cell a3 and a cell a4 that run based on a baseband board #2. The CoMP cluster b includes four cells. FIG. 2 shows a cell b1 and a cell b2 that run based on a baseband board #3, and a cell b3 and a cell b4 that run based on a baseband board #4. The cell a4 and the cell b1 are two adjacent cells. That is, the cell a4 is an edge cell in the CoMP cluster a, and the cell b1 is an edge cell in the CoMP cluster b.

In FIG. 2, the baseband board #1 and the baseband board #2 in the base station A are separately connected to the processing board #1, to support communication between the cell a1 to the cell a4 and the processing board #1. In addition, the baseband board #3 in the base station B is also connected to the processing board #1, to support communication between the cell b1 and the processing board #1. The baseband board #3 and the baseband board #4 in the base station B are respectively connected to the processing board #2, to support communication between the cell b1 to the cell b4 and the processing board #2. In addition, the baseband board #2 in the base station A is also connected to the processing board #2, to support communication between the cell a4 and the processing board #2.

In FIG. 2, the second network control device is a processing board #3, and the processing board #3 is separately connected to the processing board #1 and the processing board #2.

In this embodiment of this application, in addition to communicating with the processing board #1 and the processing board #2, the processing board #3 may further implement, by using a connection between the processing board #1 and the baseband board and a connection between the processing board #2 and the baseband board, indirect communication with the edge cell that runs based on the baseband board. For example, the processing board #3 may implement indirect communication with the cell a4 or the cell b1 by using the processing board #1 or the processing board #2.

Alternatively, in another possible implementation, the processing board #3 may also be directly connected to the baseband board in a base station, to implement direct communication with the edge cell that runs based on the baseband board.

Figure 3:
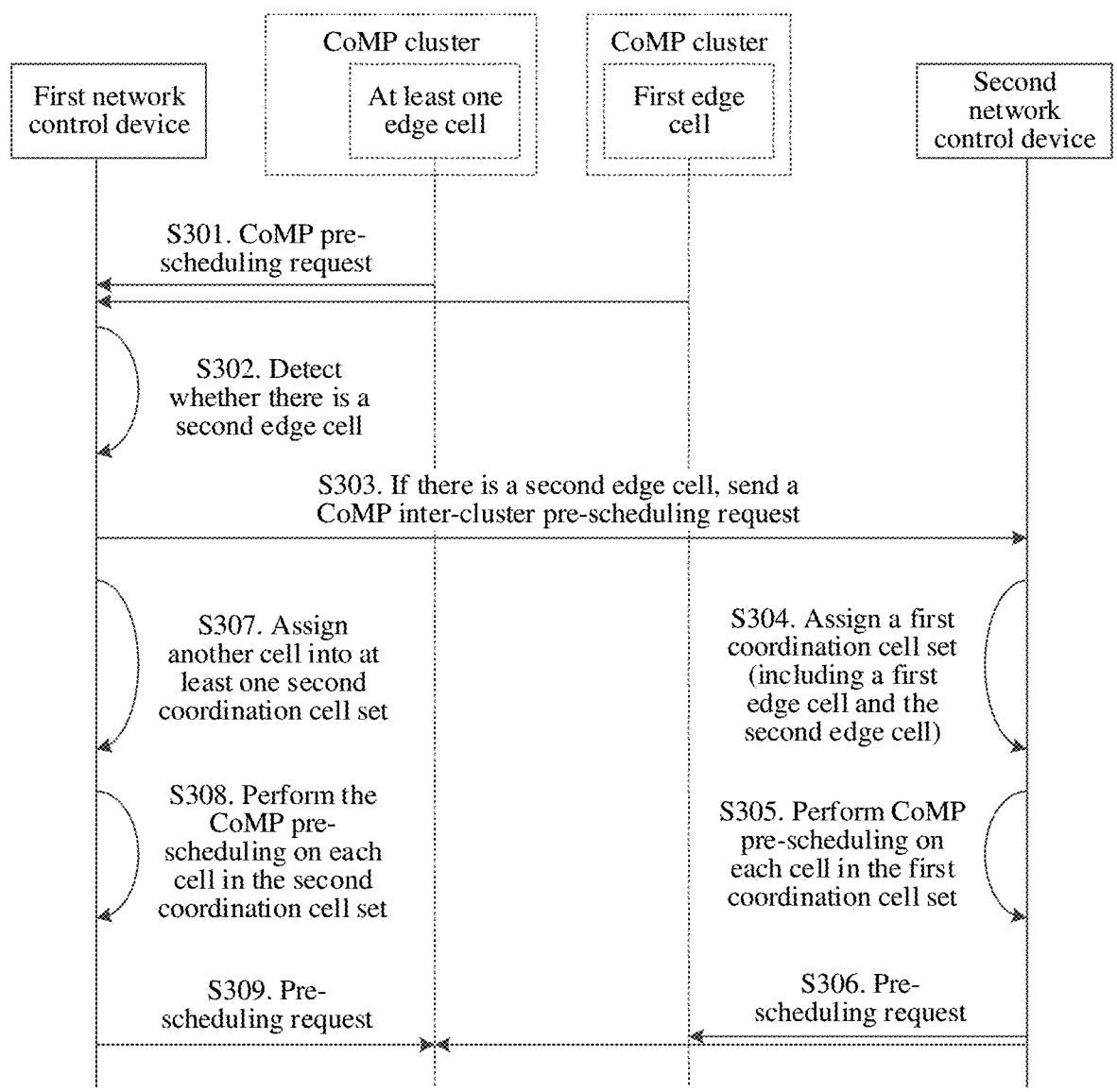
FIG. 3 is a method flowchart of an inter-cell coordinated scheduling method according to an example embodiment of this application.

In an embodiment of this application, in a scenario in which inter-cell coordinated transmission is performed by using a CoMP technology, in addition to receiving a CoMP pre-scheduling request sent by a cell in a CoMP cluster, a first network control device corresponding to the CoMP cluster further receives a CoMP pre-scheduling request sent by an edge cell in an adjacent CoMP cluster, and determines, with reference to the CoMP pre-scheduling request of the edge cell in the CoMP cluster and the CoMP pre-scheduling request of the edge cell in the adjacent CoMP cluster, whether the edge cell in the CoMP cluster and the edge cell in the adjacent CoMP cluster meet a condition for performing coordination with each other, and if the condition for performing the coordination with each other is met, the first network control device requests the second network control device to assign the edge cell in the CoMP cluster and the edge cell in the adjacent CoMP cluster into a same coordination cell set across CoMP clusters, and the second network control device performs CoMP pre-scheduling on cells in the coordination cell set across the CoMP clusters. For the foregoing implementation process, refer to subsequent descriptions in the embodiment shown in FIG. 3. For ease of understanding, several noun concepts used in FIG. 3 are described herein.

(1) A first edge cell and a second edge cell.

It is assumed that there is a CoMP cluster 1 and a CoMP cluster 2, and an edge cell 1 in the CoMP cluster 1 and an edge cell 2 in the CoMP cluster 2 are adjacent to each other and meet a condition for performing coordination between the two cells. In this case, for the CoMP cluster 1, the edge cell 1 is a second edge cell, an edge cell 2 in the CoMP cluster 2 is a first edge cell; or, for the CoMP cluster 2, the edge cell 2 is a second edge cell, and the edge cell 1 in the CoMP cluster 1 is a first edge cell.

For example, as shown in FIG. 2, an edge cell a4 belongs to a CoMP cluster a, and an edge cell b1 belongs to a CoMP cluster b. In this case, for the CoMP cluster a, the edge cell a4 is a second edge cell, and the edge cell b1 is a first edge cell; or, for the CoMP cluster b, the edge cell a4 is a first edge cell, and the edge cell b1 is a second edge cell.

(2) A first coordination cell set and a second coordination cell set.

In the embodiment shown in FIG. 3, a coordination cell set that includes edge cells of different CoMP clusters and that is assigned by the second network control device is referred to as a first coordination cell set, and a coordination cell set that includes cells in a corresponding CoMP cluster and that is assigned by each first network control device is referred to as a second coordination cell set.

In this embodiment of the present invention, a coordination cell set includes at least two cells that perform CoMP coordination with each other. In some data or documents, the coordination cell set is also referred to as a coordination area.

FIG. 3 is a method flowchart of an inter-cell coordinated scheduling method according to an example embodiment of this application. The inter-cell coordinated scheduling method may be applied to the inter-cell coordinated scheduling system shown in FIG. 1, and is performed by a first network control device and a second network control device. For a deployment status of the first network control device and the second network control device, refer to FIG. 2. As shown in FIG. 3, the inter-cell coordinated scheduling method may include the following steps.

Step 301: The first network control device receives coordinated multiple points CoMP pre-scheduling requests respectively corresponding to at least one edge cell and a first edge cell.

In this embodiment of the present invention, the at least one edge cell belongs to a CoMP cluster corresponding to the first network control device.

Each CoMP cluster includes at least two cells, and the at least two cells include at least one edge cell. In this embodiment of this application, the foregoing first edge cell is adjacent to at least one edge cell in the CoMP cluster corresponding to the first network control device, and the first edge cell does not belong to the CoMP cluster corresponding to the first network control device.

For example, FIG. 2 is used as an example. When the first network control device is implemented based on the processing board #1 in the base station A, the CoMP cluster corresponding to the foregoing first network control device is a CoMP cluster a, the foregoing at least one edge cell is a cell a4 in the CoMP cluster a, and the foregoing first edge cell is a cell b1 in the CoMP cluster b. Correspondingly, when the first network control device is implemented based on the processing board #2 in the base station B, the CoMP cluster corresponding to the foregoing first network control device is a CoMP cluster b, the foregoing at least one edge cell is a cell b1 in the CoMP cluster b, and the foregoing first edge cell is a cell a4 in the CoMP cluster a.

In this embodiment of this application, when performing CoMP scheduling, each cell in a CoMP cluster may send a CoMP pre-scheduling request to the first network control device corresponding to the CoMP cluster. For an edge cell in the CoMP cluster, in addition to sending the CoMP pre-scheduling request to the first network control device corresponding to the CoMP cluster, the edge cell further needs to send the CoMP pre-scheduling request to a first network control device corresponding to another CoMP cluster adjacent to the edge cell. That an edge cell is adjacent to another CoMP cluster may mean that the edge cell is adjacent to an edge cell in the another CoMP cluster. The first network control devices respectively corresponding to a plurality of CoMP clusters synchronously perform the foregoing step 301, that is, each first network control device receives a CoMP pre-scheduling request of at least one edge cell in a CoMP cluster corresponding to each first network control device, and a CoMP pre-scheduling request of a cell (corresponding to the foregoing first edge cell) that is adjacent to the at least one edge cell and belongs to another CoMP cluster. Specifically, for example, the first network control device may receive a CoMP pre-scheduling request sent by a baseband board on which each of at least one edge cell and the first edge cell is located.

In this embodiment of this application, the CoMP pre-scheduling request includes radio environment information of an accessed terminal in a corresponding cell, and the radio environment information is used to indicate signal quality that is detected by the corresponding terminal and that is of each surrounding cell.

In actual application, after accessing a cell, the terminal not only communicates with the accessed cell, but also may periodically or aperiodically measure signal quality of another surrounding cell in addition to the current accessed cell, to obtain radio environment information of the terminal. In this embodiment of this application, the terminal uploads, to the currently accessed cell, the radio environment information obtained through measurement, so that the currently accessed cell adds the radio environment information of each accessed terminal to a CoMP pre-scheduling request, and sends the CoMP pre-scheduling request to a corresponding first network control device.

In this embodiment of this application, the foregoing radio environment information may include at least one of the following information: a channel quality indicator (CQI) that is detected by a corresponding terminal and that is of each surrounding cell, and a signal-to-noise ratio (SNR) that is detected by the corresponding terminal and that is of each surrounding cell, and signal strength that is detected by the corresponding terminal and that is of each surrounding cell.

Optionally, in this embodiment of this application, the CoMP pre-scheduling request may further include other information used for coordination cell set assigning or CoMP pre-scheduling. For example, the foregoing information used for the coordination cell set assigning may include at least one of a current to-be-transmitted data volume of an accessed terminal in a corresponding cell, current scheduling information (for example, a current scheduling priority) of the accessed terminal in the corresponding cell, resource block (RB) utilization of the corresponding cell, and an identifier of the corresponding cell.

After receiving the CoMP pre-scheduling requests that are respectively of the at least one edge cell and the first edge cell, the first network control device may determine, based on the CoMP pre-scheduling requests that are respectively of the at least one edge cell and the first edge cell, whether the at least one edge cell has a second edge cell meeting a preset condition, and the determining process may be shown in the following step 302.

Step 302: The first network control device detects, based on the radio environment information of the accessed terminal in the at least one edge cell and the radio environment information of the accessed terminal in the first edge cell, that the at least one edge cell has a second edge cell meeting the preset condition with the first edge cell.

In this embodiment of this application, when determining whether the preset condition is met between the first edge cell and the second edge cell, the first network control device may calculate, based on radio environment information of an accessed terminal in the first edge cell, a coordination gain brought by adjacent cells of the first edge cell to the first edge cell; the first network control device may calculate, based on radio environment information of an accessed terminal in the second edge cell, a coordination gain brought by adjacent cells of the second edge cell to the second edge cell; and when an affinity condition is met between the coordination gain brought by the adjacent cells of the first edge cell to the first edge cell and the coordination gain brought by the adjacent cells of the second edge cell to the second edge cell, it is determined that the preset condition is met between the first edge cell and the second edge cell.

In this embodiment of this application, the foregoing coordination gain is used to indicate an effect of coordinated transmission performed by one cell on an accessed terminal in another cell.

Optionally, when calculating, based on the radio environment information of the accessed terminal in the first edge cell, the coordination gain brought by the adjacent cells of the first edge cell to the first edge cell, for each adjacent cell of the first edge cell, a coordination gain brought by the adjacent cell to each accessed terminal in the first edge cell may be calculated, and coordination gain a coordination gain brought by the adjacent cell to the first edge cell is calculated based on the coordination gain brought by the adjacent cell to each accessed terminal in the first edge cell.

In this embodiment of this application, a coordination gain brought by one cell (for example, a cell 1) to another cell (for example, a cell 2) may be calculated based on radio environment information obtained by an accessed terminal in the cell 2 by measuring the cell 1. For example, the radio environment information includes a CQI that is detected by a corresponding terminal and that is of each surrounding cell, an SNR that is detected by the corresponding terminal and that is of each surrounding cell, and a signal strength that is detected by the corresponding terminal and that is of each surrounding cell. When the radio environment information includes the CQI that is detected by the corresponding terminal and that is of each surrounding cell, if an accessed terminal in the cell 2 detects a higher CQI of the cell 1, it may be considered that a coordination effect brought by the cell 2 to the accessed terminal in the cell 1 is better, that is, a coordination gain brought by the cell 2 to the cell 1 is larger. Correspondingly, when the radio environment information includes the SNR that is detected by the corresponding terminal and that is of each surrounding cell, if the accessed terminal in the cell 2 detects that the SNR of the cell 1 is higher, it may be considered that a coordination effect brought by the cell 2 to the accessed terminal in the cell 1 is better, that is, a coordination gain brought by the cell 2 to the cell 1 is larger. When the radio environment information includes the signal strength that is detected by the corresponding terminal and that is of each surrounding cell, if the accessed terminal in the cell 2 detects that the signal strength of the cell 1 is higher, it may also be considered that a coordination effect brought by the cell 2 to the accessed terminal in the cell 1 is better, that is, the coordination gain brought by the cell 2 to the cell 1 is larger.

According to the foregoing principle, the first network control device may measure, based on the accessed terminal in the first edge cell, radio environment information obtained by adjacent cells around the first edge cell, and calculate a coordination gain brought by each adjacent cell to the first edge cell by using a predetermined algorithm.

Optionally, the CoMP pre-scheduling request further includes weight information of an accessed terminal in a corresponding cell, and the weight information includes at least one of a current to-be-transmitted data volume and a current scheduling priority. When determining whether a preset condition is met between the first edge cell and the second edge cell, the first network control device may calculate, based on the radio environment information of the accessed terminal in the first edge cell and the weight information of the accessed terminal in the first edge cell, a coordination gain brought by adjacent cells of the first edge cell to the first edge cell; and the first network control device calculates, based on the radio environment information of the accessed terminal in the second edge cell and the weight information of the accessed terminal in the second edge cell, a coordination gain brought by adjacent cells of the second edge cell to the second edge cell. When an affinity condition is met between the coordination gain brought by the adjacent cells of the first edge cell to the first edge cell and the coordination gain of the adjacent cells of the second edge cell to the second edge cell, it may be determined that the preset condition is met between the first edge cell and the second edge cell.

For example, when calculating, based on the coordination gain brought by the adjacent cell to the accessed terminal in the first edge cell, a coordination gain brought by the adjacent cell to first edge cell, for each adjacent cell of the first edge cell, the first network control device may calculate, based on the radio environment information obtained by each terminal in the first edge cell by measuring the adjacent cell, a coordination gain of the adjacent cell brought by the adjacent cell to the accessed terminal in the first edge cell, and determine a weight of each accessed terminal in the first edge cell based on the weight information of each accessed terminal in the first edge cell, and perform, based on the weight of each accessed terminal in the first edge cell, weighted summation on the coordination gain brought by the adjacent cell to the accessed terminal in the first edge cell, to obtain a coordination gain brought by the adjacent cell to the first edge cell.

In actual application, some terminals may need to preferentially accept inter-cell coordination, and some other terminals may not need the inter-cell coordination. For example, when there is a relatively large amount of data currently to be transmitted by a terminal, the terminal may need to preferentially accept the inter-cell coordination, to transmit data in time. Correspondingly, when there is a relatively small amount of data currently to be transmitted by a terminal, the terminal may not need to accept the inter-cell coordination. Alternatively, if a current scheduling priority of a terminal is relatively high, the terminal needs to preferentially accept the inter-cell coordination. Correspondingly, if a current scheduling priority of the terminal is relatively low, the terminal may not need to accept the inter-cell coordination.

However, a plurality of terminals may be accessed to one cell, and states of the terminals are different. To more accurately calculate a coordination gain brought by one cell to another cell, in this embodiment of this application, a weight of which an accessed terminal in the cell needs to accept the inter-cell coordination may be considered, in addition, a coordination gain brought by one cell to another cell is calculated through weighting with reference to the weight of which the accessed terminal in the cell needs to accept the inter-cell coordination, where a terminal that needs to preferentially accept the inter-cell coordination may have a higher weight. For example, a larger amount of data currently to be transmitted by the terminal indicates a higher weight of the terminal, and a smaller amount of data currently to be transmitted by the terminal indicates a lower weight of the terminal; and/or, a higher current scheduling priority of the terminal indicates a higher weight of the terminal, and a lower current scheduling priority of the terminal indicates a lower weight of the terminal.

Similarly, when calculating, based on the radio environment information of the accessed terminal in the second edge cell and the weight information of the accessed terminal in the second edge cell, the coordination gain brought by the adjacent cells of the second edge cell to the second edge cell, for each adjacent cell of the second edge cell, a coordination gain brought by the adjacent cell to each accessed terminal in the second edge cell may be calculated, and based on the coordination gain brought by the adjacent cell to each accessed terminal in the second edge cell, a coordination gain brought by the adjacent cell to the second edge cell is calculated.

In actual application, when coordination gains brought by two adjacent cells to each other is relatively low, or a coordination gain brought by one cell to another cell is relatively high, while a coordination gain brought by the another cell to the cell is relatively low, if the two cells are assigned into a same coordination cell set, when CoMP scheduling is subsequently performed, a coordination effect of at least one cell is poor, and a relatively high coordination effect can be achieved during subsequent scheduling only when coordination gains brought by two cells in the same coordination cell set to each other is relatively high. Therefore, in this embodiment of this application, only when the coordination gain brought by the first edge cell to the second edge cell and the coordination gain brought by the second edge cell to the first edge cell meet a specific condition (that is, the foregoing affinity condition), it is considered that the preset condition is met between the first edge cell and the second edge cell.

In this embodiment of this application, the foregoing affinity condition may include a coordination gain brought by the second edge cell to the first edge cell, greater than the coordination gain brought by adjacent cells in a same cluster of the first edge cell to the first edge cell, and a coordination gain brought by the first edge cell to the second edge cell, greater than the coordination gain brought by adjacent cells in a same cluster of the second edge cell to the second edge cell, where the adjacent cells in the same cluster are adjacent cells in the same CoMP cluster; or, a coordination gain brought by the second edge cell to the first edge cell, greater than a larger value of a first preset gain and the coordination gain brought by adjacent cells in a same cluster of the first edge cell to the first edge cell, and a coordination gain brought by the first edge cell to the second edge cell, greater than a larger value of a second preset gain and the coordination gain brought by adjacent cells in a same cluster of the second edge cell to the second edge cell, where the adjacent cells in the same cluster are adjacent cells in the same CoMP cluster.

In this embodiment of this application, a preset condition is met between two cells (for example, the cell 1 and the cell 2), and the cell 1 needs to provide a relatively good coordination effect for the accessed terminal in the cell 2 when performing CoMP coordination on the accessed terminal in the cell 2. In addition, when performing the CoMP coordination on the accessed terminal in the cell 1, the cell 2 can also provide a relatively good coordination effect for the accessed terminal in the cell 1, that is, only when two cells can provide a relatively good coordination effect for the accessed terminal in the other cell, it is considered that the preset condition is met between the two cells, and such two cells are assigned into the same coordination cell set, to achieve a relatively good coordination effect during subsequent CoMP scheduling.

For the foregoing first edge cell and the second edge cell, when a coordination gain brought by the second edge cell to the first edge cell is greater than a coordination gain brought by adjacent cells in a same cluster of the first edge cell to the first edge cell, it may be considered that an effect of using the second edge cell in another CoMP cluster to perform coordinated transmission for the terminal in the first edge cell is better than an effect of using the cell in the same CoMP cluster to perform the coordinated transmission for the terminal in the first edge cell. In addition, when the coordination gain brought by the first edge cell to the second edge cell is greater than the coordination gain brought by adjacent cells in a same cluster of the second edge cell to the second edge cell, it may be considered that an effect of using the first edge cell in another CoMP cluster to perform coordinated transmission for the terminal in the second edge cell is better than an effect of using the cell in the same cluster to perform the coordinated transmission for the terminal in the second edge cell. In this case, if the first edge cell and the second edge cell are assigned into the same coordination cell set, a coordination effect obtained by performing the CoMP scheduling on the first edge cell and the second edge cell is better than a coordination effect obtained by respectively assigning the first edge cell and the second edge cell into the CoMP cluster formed by the cells in the same CoMP cluster, in this case, it may be considered that the preset condition is met between the first edge cell and the second edge cell.

Optionally, if the coordination gain brought by the second edge cell to the first edge cell is greater than the coordination gain brought by adjacent cells in the same cluster of the first edge cell to the first edge cell, the coordination gain brought by the first edge cell to the second edge cell is greater than the coordination gain brought by adjacent cells in the same cluster of the second edge cell to the second edge cell, but an absolute value of the coordination gain brought by the second edge cell to the first edge cell is relatively small; and/or, an absolute value of the coordination gain brought by the first edge cell to the second edge cell is relatively small. In this case, even if the first edge cell and the second edge cell are assigned into the same coordination cell set, a finally obtained coordination effect is relatively limited. Therefore, in this embodiment of this application, when the coordination gain brought by the second edge cell to the first edge cell is greater than the coordination gain brought by adjacent cells in the same cluster of the first edge cell to the first edge cell, and the coordination gain brought by the second edge cell to the first edge cell is greater than a preset gain, and when the coordination gain brought by the first edge cell to the second edge cell is greater than the coordination gain brought by adjacent cells in the same cluster of the second edge cell to the second edge cell, and the coordination gain brought by the first edge cell to the second edge cell is greater than a preset gain, it is determined that the preset condition is met between the first edge cell and the second edge cell, to ensure a subsequent coordination effect.

Step 303: When the second edge cell exists, the first network control device sends an inter-cluster pre-scheduling request to the second network control device, and the second network control device receives the inter-cluster pre-scheduling request.

The inter-cluster pre-scheduling request is used to instruct the second network control device to assign a first coordination cell set, and the first coordination cell set includes a first edge cell and a second edge cell.

In this embodiment of this application, the inter-cluster pre-scheduling request may instruct the second network control device to assign the first edge cell and the second edge cell into a same coordination cell set across CoMP clusters. For example, the inter-cluster pre-scheduling request may include a correspondence between the first edge cell and the second edge cell.

Optionally, in this embodiment of this application, the inter-cluster pre-scheduling request may further include information used when pre-scheduling is performed on a cell. For example, the inter-cluster pre-scheduling request may further include resource block reservation (used for resource coordination between CoMP clusters) of the first edge cell and the second edge cell, other cell-related information, user scheduling-related information, and the like.

Step 304: The second network control device assigns the first coordination cell set based on the inter-cluster pre-scheduling request.

After receiving the inter-cluster pre-scheduling requests respectively sent by first network control devices, the second network control device performs coordination cell set assigning in combination with the inter-cluster pre-scheduling requests respectively sent by the first network control devices, to assign edge cells that have a relatively good coordination effect compared with each other into a same coordination cell set.

For example, after the second network control device receives the inter-cluster pre-scheduling request sent by the first network control device corresponding to the first edge cell, and receives the inter-cluster pre-scheduling request sent by the first network control device corresponding to the second edge cell, if the inter-cluster pre-scheduling requests sent by the two first network control devices match each other (for example, the inter-cluster pre-scheduling requests sent by the two first network control devices both indicate that the first edge cell and the second edge cell are assigned into the same coordination cell set across the CoMP clusters), a first coordination cell set including the first edge cell and the second edge cell is assigned.

After assigning the first coordination cell set, the second network control device may send a CoMP pre-scheduling request based on the first coordination cell set. A process of sending the CoMP pre-scheduling request is described in the following step 305 and step 306.

Step 305: The second network control device performs CoMP pre-scheduling on cells in the first coordination cell set, to obtain CoMP pre-scheduling results respectively corresponding to the first edge cell and the second edge cell.

After assigning the first coordination cell set, the second network control device may perform the CoMP pre-scheduling on cells in the first coordination cell set, to determine resources that are respectively scheduled by the first edge cell to terminals in the second edge cell, determine resources that are separately scheduled by the second edge cell to terminals in the first edge cell, and obtain CoMP pre-scheduling results respectively corresponding to the first edge cell and the second edge cell.

Step 306: The second network control device respectively sends the CoMP pre-scheduling results corresponding to the first edge cell and the second edge cell to the first edge cell and the second edge cell.

Specifically, the first network control device may separately send the CoMP pre-scheduling result corresponding to each cell in the first coordination cell set to a baseband board corresponding to each cell in the first coordination cell set.

Optionally, the first edge cell and the second edge cell respectively perform the CoMP scheduling based on the CoMP pre-scheduling results corresponding to the first edge cell and the second edge cell.

Optionally, in this embodiment of the present invention, the first network control device may further assign another cell into at least one second coordination cell set based on a CoMP pre-scheduling request of the another cell different from the first edge cell in at least two cells included in the corresponding CoMP cluster, and the assigning process may be shown in the following step 307.

Step 307: The first network control device assigns another cell into at least one second coordination cell set based on the radio environment information of the accessed terminal in the another cell different from the first edge cell in the at least two cells included in the corresponding CoMP cluster.

In this embodiment of this application, for other cells different from the first edge cell in the CoMP cluster corresponding to the first network control device, it may be considered that the cells are not suitable for being assigned into the coordination cell set between CoMP clusters. In this case, the first network control device may perform CoMP cluster assigning on the other cells expect the first edge cell, that is, these other cells are assigned into at least one second coordination cell set.

Optionally, during assigning of the second coordination cell set, for every two adjacent cells in other cells different from the first edge cell, the first network control device may calculate a coordination gain between the two cells, and assign the second coordination cell set based on the coordination gain between the two adjacent cells, to ensure that a best coordination effect can be achieved when cells in each coordination cell set collaborate with each other, that is, two cells with relatively high coordination gains are assigned into a same second coordination cell set as much as possible.

Optionally, when the coordination gain is calculated, calculation may also be performed with reference to the radio environment information of the accessed terminal in another cell and the weight information of the accessed terminal in the another cell. Details are not described herein again.

After assigning the second coordination cell set, the first network control device may send the CoMP pre-scheduling request based on the second coordination cell set. A process of sending the CoMP pre-scheduling request is described in the following step 308 and step 309.

Step 308: The first network control device performs CoMP pre-scheduling on each cell in the second coordination cell set, to obtain a CoMP pre-scheduling result corresponding to each cell in the second coordination cell set.

Step 309: The first network control device sends the CoMP pre-scheduling result corresponding to each cell in the second coordination cell set to each cell in the second coordination cell set.

Specifically, the first network control device may separately send the CoMP pre-scheduling result corresponding to each cell in the second coordination cell set to a baseband board corresponding to each cell in the second coordination cell set.

Optionally, each cell in the second coordination cell set performs the CoMP scheduling based on the CoMP pre-scheduling result corresponding to each cell.

Step 308 and step 309 are similar to step 305 and step 306, and details are not described herein again.

It should be noted that the foregoing step 304 to step 306 are serially processed, step 307 to step 309 are serially processed, and step 304 to step 306 and step 307 to step 309 may be processed in parallel.

Optionally, in this embodiment of this application, before sending the inter-cluster pre-scheduling request to the second network control device, the first network control device further determines a first reserved resource, where the first reserved resource is a resource reserved for the first edge cell and the second edge cell to perform scheduling. When sending the inter-cluster pre-scheduling request to the second network control device, the first network control device may send the inter-cluster pre-scheduling request including the first reserved resource to the second network control device. After receiving the inter-cluster pre-scheduling request, the second network control device determines an actually used resource in the first reserved resource, where the actually used resource is a resource used by the second network control device when the second network control device performs CoMP pre-scheduling on each cell in the first coordination cell set.

Optionally, when determining the first reserved resource, the first network control device determines a start resource location of the first reserved resource based on an identifier of the first edge cell and an identifier of the second edge cell, determines a quantity of resources of the first reserved resource based on resource requirement information of the accessed terminal in the first edge cell and resource requirement information of the accessed terminal in the second edge cell, and determines the reserved resource based on the start resource location of the first reserved resource and the quantity of resources of the first reserved resource, where the resource requirement information includes at least one of a current to-be-transmitted data volume of a corresponding terminal, a current scheduling priority of the corresponding terminal, and radio environment information of the corresponding terminal.

Optionally, when determining the actually used resource in the first reserved resource, the second network control device may determine an intersection set of the first reserved resource and the second reserved resource as the actually used resource, where the second reserved resource is determined by the first network control device corresponding to the first edge cell, and is a resource reserved for the first edge cell and the second edge cell to perform scheduling.

Optionally, in this embodiment of this application, the second network control device further sends a resource allocation indication to the first network control device, where the resource allocation indication is used to indicate an unused resource other than the actually used resource in the reserved resource. The first network device recycles the unused resource in the reserved resource based on the resource allocation indication.

Optionally, an actually used resource of the edge cell only belongs to a coordination cell set in which the edge cell is located.

Because networking environments of cells in different CoMP clusters may be different, the foregoing second coordination cell set and the first coordination cell set may use different coordinated sub-processing technologies. To prevent a same resource from being simultaneously scheduled by two coordination cell sets that use different coordinated sub-processing technologies, in this embodiment of this application, a resource block of an edge cell only belongs to the coordination cell set in which the edge cell is located.

Optionally, when assigning the first coordination cell set and performing pre-scheduling on each cell in the first coordination cell set, the second network control device may assign the first coordination cell set within a current transmission time interval TTI based on the inter-cluster pre-scheduling request, send a CoMP pre-scheduling result within the current TTI based on the first coordination cell set, that is, performing CoMP pre-scheduling on each cell in the first coordination cell set within the current TTI, to obtain CoMP pre-scheduling results respectively corresponding to the first edge cell and the second edge cell, and separately send the CoMP pre-scheduling results respectively corresponding to the first edge cell and the second edge cell to the first edge cell and the second edge cell, so that the first edge cell and the second edge cell respectively perform CoMP scheduling based on the CoMP pre-scheduling results respectively corresponding to the first edge cell and the second edge cell within a next TTI.

Correspondingly, when assigning the second coordination cell set and sending the CoMP pre-scheduling request based on the second coordination cell set, the first network control device assigns another cell into at least one second coordination cell set within the current TTI based on a CoMP pre-scheduling request of another cell different from the first edge cell in the at least two cells, sends a CoMP pre-scheduling request based on the second coordination cell set, that is, performing CoMP pre-scheduling on each cell in the second coordination cell set within the current TTI, to obtain a CoMP pre-scheduling result corresponding to each cell in the second coordination cell set, and sends the CoMP pre-scheduling result corresponding to each cell in the second coordination cell set to each cell in the second coordination cell set, so that each cell in the second coordination cell set respectively performs CoMP scheduling within the next TTI based on the CoMP pre-scheduling result corresponding to each cell.

According to the solution shown in this embodiment of this application, TTI-level coordination cell set assigning and CoMP scheduling may be implemented. To be specific, after performing coordination cell set assigning and pre-scheduling within the current TTI, the first network control device or the second network control device sends a pre-scheduling result to a corresponding cell, and after receiving the pre-scheduling result, the corresponding cell performs CoMP real scheduling within the next TTI of the current TTI. In other words, according to the solution shown in this embodiment of this application, the first network device or the second network control device assigns the coordination cell set of the cell by using the TTI as a period. An assigning period of the coordination cell set is short. Correspondingly, a subsequently obtained pre-scheduling result is more close to real radio environment information, which avoids an inaccurate pre-scheduling result caused by radio environment changes during long-period coordination cell set assigning, thereby improving the CoMP coordination effect. Specifically, FIG. 4 is a diagram of coordination cell set assigning and a scheduling time sequence according to an embodiment of this application.

Figure 4:
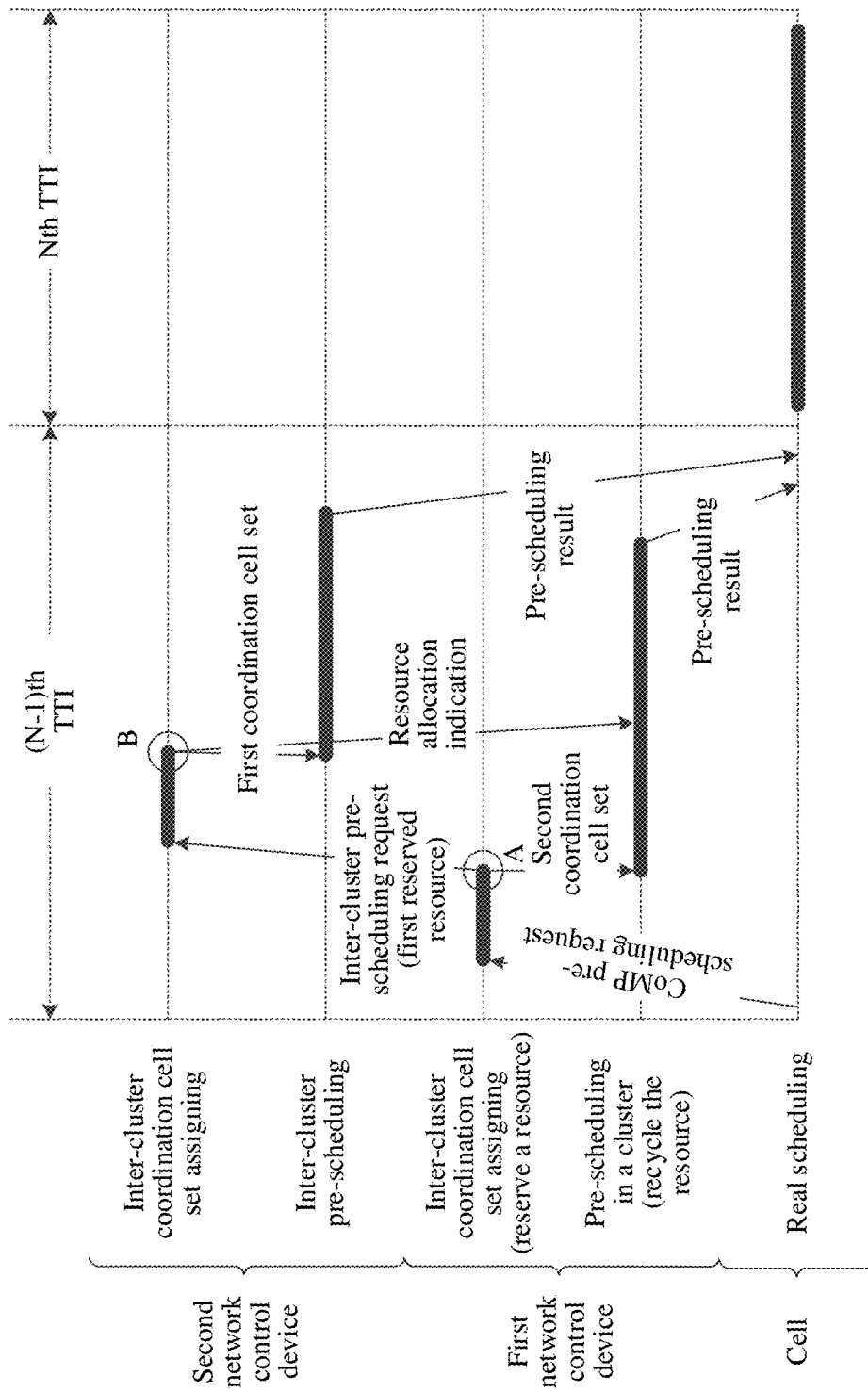
FIG. 4 is a diagram of coordination cell set assigning and a scheduling sequence according to an embodiment shown in FIG. 3.

As shown in FIG. 4, within N−1 TTIs, after receiving a CoMP pre-scheduling request sent by each cell, a first network control device assigns a CoMP inter-cluster coordination cell set (corresponding to the foregoing step 302 and step 307), reserves a CoMP inter-cluster resource, performs CoMP pre-scheduling (corresponding to the foregoing step 308) on a cell that is in a second coordination cell set and that is obtained by assigning the CoMP inter-cluster coordination cell set, and sends a pre-scheduling result to the cell in the second coordination cell set (corresponding to the foregoing step 309). In addition, the first network control device further sends an inter-cluster pre-scheduling request to the second network control device within the (N−1)th TTI, and the second network control device assigns the first coordination cell set (CoMP inter-cluster coordination cell set assigning) within the (N−1)th TTI based on the inter-cluster pre-scheduling request, performs pre-scheduling (inter-CoMP cluster pre-scheduling) on each cell in the first coordination cell set, and sends a pre-scheduling result to each cell in the first coordination cell set (corresponding to the foregoing step 302 to step 306).

The inter-cluster pre-scheduling request sent by the first network control device further indicates a reserved CoMP inter-cluster resource (that is, a first reserved resource). In a process of assigning the second coordination cell set, the second network control device further determines an actually used resource in the reserved CoMP inter-cluster resource, and returns a resource allocation indication to the first network control device, and the first network control device recycles the reserved CoMP inter-cluster resource based on the resource allocation indication, where the foregoing processes are all completed within the (N−1)th TTI.

In the Nth TTIs in FIG. 4, each cell in the first coordination cell set and each cell in the second coordination cell set perform real scheduling based on respective pre-scheduling results.

At a point A in FIG. 4, inter-cluster coordination requirements need to be considered during dynamic assigning of the coordination cell set in the CoMP cluster. If it is determined that inter-CoMP cluster coordination needs to be performed, a resource is reserved, and the reserved resource is indicated to the second network control device by using the inter-cluster pre-scheduling request. In addition, another intra-frequency adjacent cell in the CoMP cluster is scheduled in a centralized manner in the CoMP cluster.

At a point B in FIG. 4, the second network control device performs centralized determining processing based on resources requested by CoMP clusters (that is, first reserved resources indicated by inter-cluster pre-scheduling requests respectively sent by first network control devices), that is, determining a resource intersection fed back by the CoMP clusters, performs centralized scheduling of coordination cell sets between CoMP clusters on the intersection; in addition, returns the assigning result (that is, the first coordination cell set) between the CoMP clusters to the first network control device, so that the first network control device may recycle a resource that is not used by CoMP coordination between CoMP clusters.

In FIG. 4, dynamic assigning of a coordination cell set in the CoMP cluster and centralized scheduling of the coordination cell set in the CoMP cluster use serial processing. Dynamic assigning of the CoMP inter-cluster coordination cell set and centralized scheduling of the CoMP inter-cluster coordination cell set are processed serially. The foregoing two processes are completed within one TTI and perform real scheduling in the next TTI.

In actual application, a protocol layer of a cell may be assigned into an L3 layer, an L2 layer, and an L1 layer from top to bottom. Using a Long Term Evolution (Long Term Evolution, LTE) air interface protocol as an example, the L3 layer may include a radio resource control (Radio Resource Control, RRC) layer, the L2 layer may include a packet data convergence protocol (Packet Data Convergence Protocol, PDCP) layer, a radio link control (Radio Link Control, RLC) layer, a media access control (Media Access Control, MAC) layer, and the like, and the L1 layer may include physical (Physical, PHY).

The first network control device and the second network control device shown in this embodiment of this application may be deployed close to the L2 layer of the cell, that is, the first network control device or the second network control device communicates with the L2 layer of each cell.

Optionally, in this embodiment of this application, the first network control device and the second network control device may be respectively assigned into two processing modules, that is, a dynamic assigning module and a centralized scheduling module.

Figure 5:
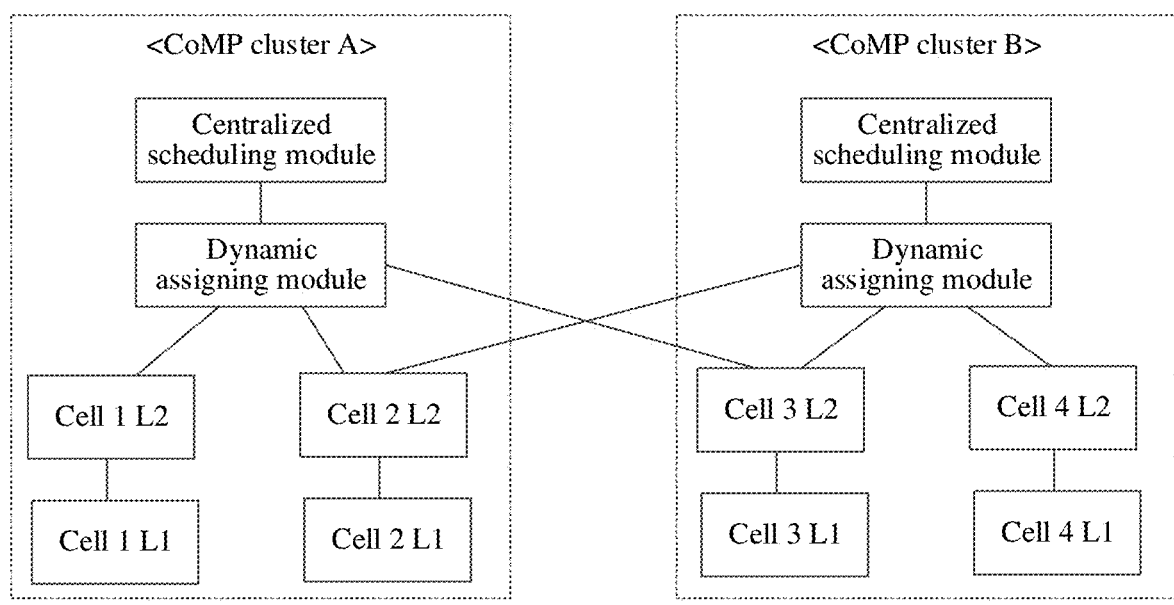
FIG. 5 is a schematic diagram of a coordination cell set assigning coordinated architecture according to an embodiment shown in FIG. 3.

Specifically, for example, the first network control device is deployed close to the L2 of each cell, and the first network control device and the second network control device respectively include a dynamic assigning module and a centralized scheduling module. FIG. 5 shows a schematic diagram of a coordination cell set assigning coordinated architecture according to an embodiment of this application.

As shown in FIG. 5, a CoMP cluster A includes a cell 1 and a cell 2, and a CoMP cluster B includes a cell 3 and a cell 4, where the cell 2 and the cell 3 are two adjacent edge cells, L2 layers of the cell 1, the cell 2, and the cell 3 are respectively connected to the dynamic assigning module of the first network control device, and L2 layers of the cell 2, the cell 3, and the cell 4 are respectively connected to the dynamic assigning module of the second network control device, while the dynamic assigning module of the first network control device and the dynamic assigning module of the second network control device are respectively connected to the dynamic assigning module of the second network control device (not shown in FIG. 5).

The dynamic assigning module of the first network control device is configured to perform the foregoing step 301, step 302, and step 307, and the centralized scheduling module of the first network control device is configured to perform the foregoing step 308 and step 309. The dynamic assigning module of the second network control device is configured to perform the foregoing step 303 and step 304, and the centralized scheduling module of the second network control device is configured to perform the foregoing step 305 and step 306.

In conclusion, according to the method shown in this embodiment of this application, during a process of performing CoMP scheduling, when a first network control device corresponding to each CoMP cluster determines, based on CoMP pre-scheduling requests respectively corresponding to an edge cell in the CoMP cluster and an edge cell in another CoMP cluster, that a second edge cell in the CoMP cluster and a first edge cell in the another CoMP cluster meet a condition of being assigned into a same coordination cell set, the second network control device assigns the first edge cell and the second edge cell into a same first coordination cell set, and the second network control device performs CoMP pre-scheduling on a cell in the first coordination cell set, thereby implementing performing the CoMP scheduling between adjacent cells belonging to different CoMP clusters, so that terminals located in edge cells in different CoMP clusters can obtain coordinated transmission services provided by a plurality of cells in different CoMP clusters, thereby avoiding interference of adjacent cells outside the CoMP cluster, and improving the effect of coordinated transmission.

In addition, in the solution shown in this embodiment of this application, during the process of performing the CoMP scheduling, the first network control device or the second network control device implements coordination cell set assigning and pre-scheduling within one TTI, and sends a pre-scheduling result to each cell. Each cell performs real scheduling within a next TTI, in this way, TTI-level coordination cell set assigning and scheduling are implemented, and accuracy and a scheduling effect of the CoMP scheduling are improved.

In another embodiment of this application, in a scenario in which inter-cell coordinated transmission is performed by using a CoMP technology, when coordination cell set assigning between CoMP clusters is not involved, and only coordination cell set assigning between cells in a single CoMP cluster is involved, the TTI-level coordination cell set assigning and CoMP scheduling may also be implemented.

Figure 6:
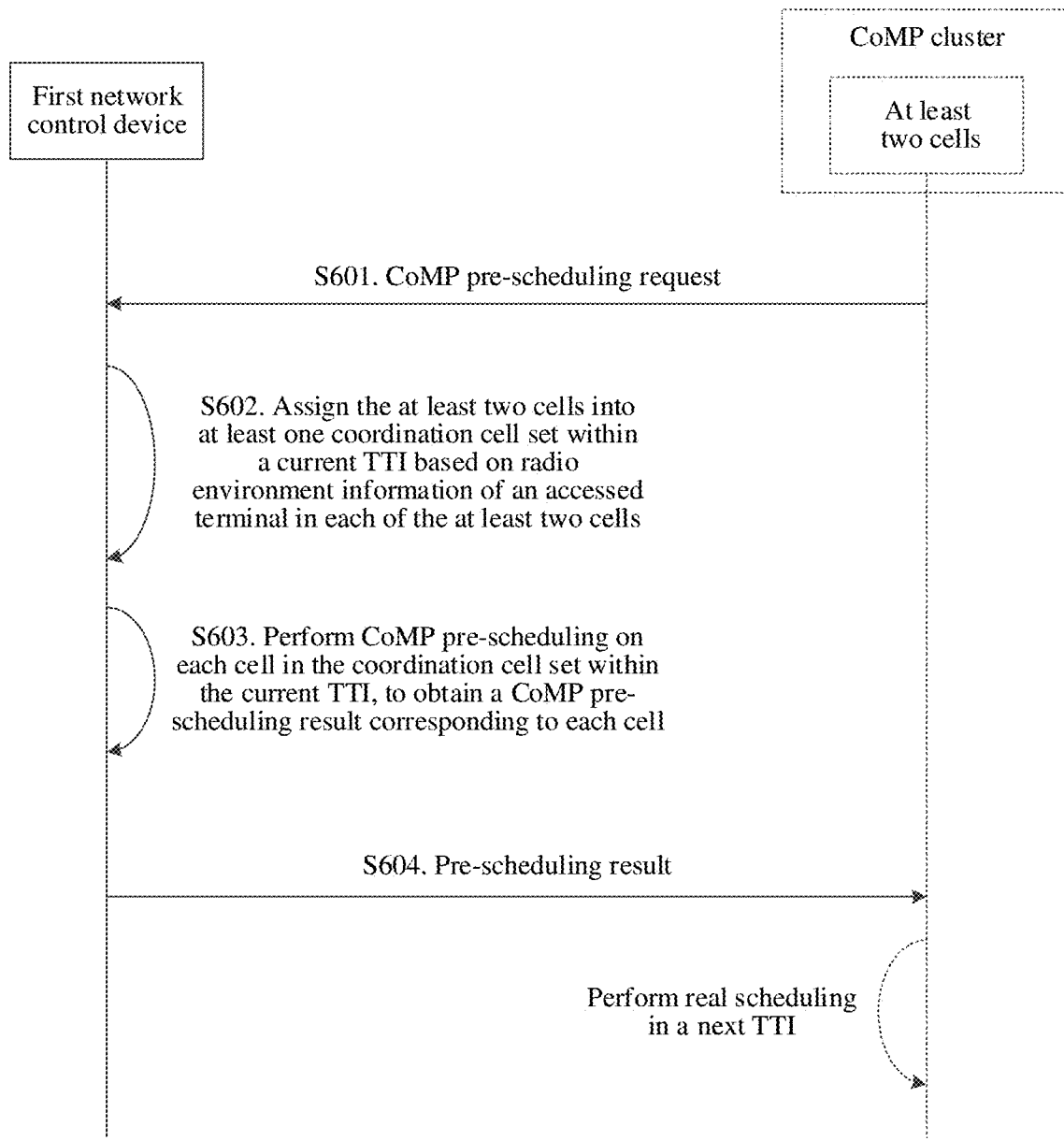
FIG. 6 is a method flowchart of an inter-cell coordinated scheduling method according to an example embodiment of this application.

FIG. 6 is a method flowchart of an inter-cell coordinated scheduling method according to an example embodiment of this application. The inter-cell coordinated scheduling method may be performed by a first network control device corresponding to a single CoMP cluster. As shown in FIG. 6, the inter-cell coordinated scheduling method may include the following steps.

Step 601: A first network control device receives coordinated multiple points CoMP pre-scheduling requests respectively corresponding to at least two cells.

The CoMP pre-scheduling request includes radio environment information of an accessed terminal in a corresponding cell, and the radio environment information is used to indicate signal quality that is detected by the corresponding terminal and that is of each surrounding cell.

Step 602: The first network control device assigns the at least two cells into at least one coordination cell set within a current TTI based on the radio environment information of the accessed terminal in each of the at least two cells.

After the at least one coordination cell set is assigned, the first network control device may send a CoMP pre-scheduling request based on the assigned coordination cell set. The sending step may be shown in the following step 603 and step 604.

Step 603: The first network control device performs CoMP pre-scheduling on each cell in the coordination cell set within the current TTI, to obtain a CoMP pre-scheduling result corresponding to each cell in the coordination cell set.

Step 604: The first network control device separately sends a CoMP pre-scheduling result corresponding to each cell in the coordination cell set to each cell in the coordination cell set, so that each cell in the second coordination cell set performs CoMP scheduling within a next TTI based on the CoMP pre-scheduling result corresponding to each cell.

Specifically, the first network control device may send the CoMP pre-scheduling result of each cell in the second coordination cell set to a baseband board corresponding to each cell.

Optionally, the CoMP pre-scheduling request further includes weight information of an accessed terminal in a corresponding cell, and the weight information includes at least one of a current to-be-transmitted data volume and a current scheduling priority. When the first network control device assigns the at least two cells into at least one coordination cell set within the current TTI based on the radio environment information of the accessed terminal in each of the at least two cells, for each of the at least two cells, the first network control device calculates, based on the radio environment information of the accessed terminal in the cell and the weight information of the accessed terminal in the cell, a coordination gain brought by adjacent cells of the cell to the cell; and for a first cell and a second cell in the at least two cells, when an affinity condition is met between a coordination gain brought by adjacent cells of the first cell to the first cell and a coordination gain brought by adjacent cells of the second cell to the second cell, the first network control device assigns the first cell and the second cell into a same coordination cell set.

The solution shown in the foregoing FIG. 6 is similar to an implementation process of performing CoMP cluster coordination cell set assigning and pre-scheduling on other cells different from the second edge cell in step 307 to step 309 in the embodiment shown in FIG. 3, and a difference lies in that when the coordination cell set assigning in the CoMP cluster is performed in step 307 to step 309 in FIG. 3, the second edge cell participating in the CoMP cluster assigning needs to be excluded. However, in this embodiment of this application, the first network control device performs the coordination cell set assigning in the CoMP cluster on all cells in the CoMP cluster without differentiating edge cells and considering reserving and recycling RB resources between CoMP clusters.

In conclusion, according to the method shown in this embodiment of this application, during a process of performing CoMP scheduling, the first network control device implements coordination cell set assigning and pre-scheduling within one TTI, and sends a pre-scheduling result to each cell. Each cell performs real scheduling within a next TTI, in this way, TTI-level coordination cell set assigning and scheduling are implemented, and accuracy and a scheduling effect of the CoMP scheduling are improved.

Figure 7:
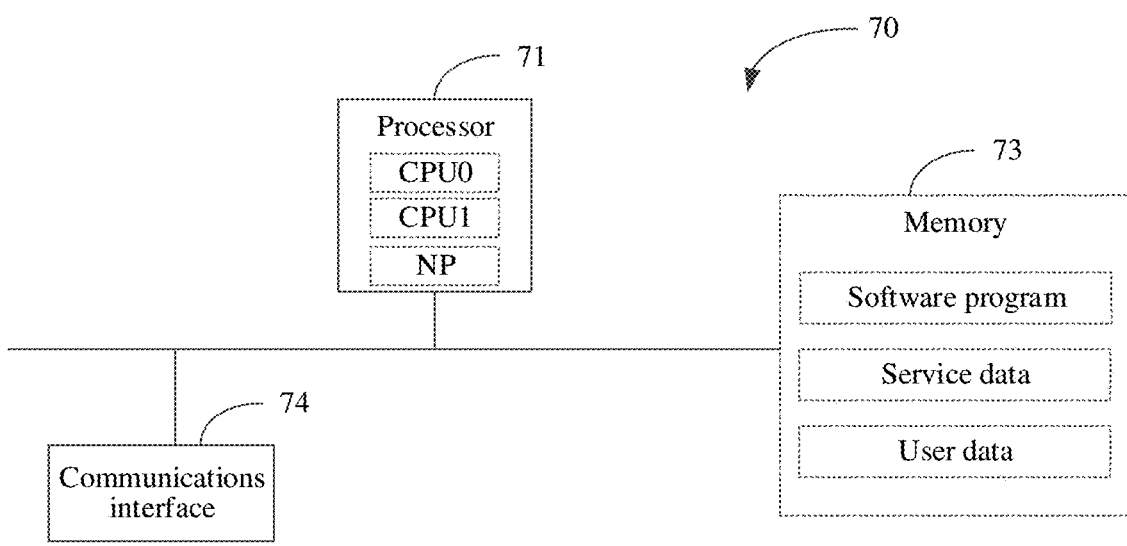
FIG. 7 is a schematic structural diagram of a network control device according to an example embodiment of this application.

FIG. 7 is a schematic structural diagram of a network control device 70 according to an example embodiment of this application. The network control device 70 may be implemented as a first network control device 120 or a second network control device 140 in the system shown in FIG. 1. As shown in FIG. 7, the network control device 70 may include a processor 71 and a communications interface 74.

The processor 71 may include one or more processing units. The processing unit may be a central processing unit (CPU), a network processor (NP), or the like.

The communications interface 74 may include a network interface. Specifically, the network interface may include a wired network interface, for example, an Ethernet interface or an optical fiber interface. The network control device 70 communicates with another network control device or cell by using the network interface 74.

Optionally, the network control device 70 may further include a memory 73. The memory 73 may be configured to store a software program, and the software program may be executed by the processor 71. In addition, the memory 73 may further store various types of service data or user data. The software program may include a communications module and a processing module.

When the network control device 70 is implemented as the first network control device 120 in the system shown in FIG. 1, the communications module is executed by the processor 71, to implement functions about receiving a CoMP pre-scheduling request, sending an inter-cluster pre-scheduling request, receiving a resource allocation indication, and sending a CoMP pre-scheduling result in the embodiment shown in the foregoing FIG. 3. The processing module is executed by the processor 71, to implement functions about determining a second edge cell, determining a first reserved resource, recycling an unused resource, assigning a second coordination cell set, and performing CoMP pre-scheduling based on each cell in the second coordination cell set in the embodiment shown in the foregoing FIG. 3.

When the network control device 70 is implemented as the second network control device 140 in the system shown in the foregoing FIG. 1, the communications module is executed by the processor 71, to implement functions about receiving an inter-cluster pre-scheduling request, sending a CoMP pre-scheduling result, and sending a resource allocation indication in the embodiment shown in the foregoing FIG. 3. The processing module is executed by the processor 71, to implement functions about assigning the first coordination cell set, performing CoMP pre-scheduling on each cell in the first coordination cell set, and determining an actually used resource in the first reserved resource in the embodiment shown in the foregoing FIG. 3.

When the network control device 70 is implemented as the first network control device 120 in the system shown in the foregoing FIG. 1, the communications module is executed by the processor 71, to implement functions about receiving a CoMP pre-scheduling request and sending a CoMP pre-scheduling result in the embodiment shown in the foregoing FIG. 6. The processing module is executed by the processor 71, to implement functions about assigning a coordination cell set and performing CoMP pre-scheduling on each cell in the coordination cell set in the embodiment shown in the foregoing FIG. 6.

Optionally, the processor 71 may be connected to the memory 73 and the communications interface 74 by using a bus.

The following is an apparatus embodiment of this application, and the apparatus embodiment may be used to execute the method embodiments of this application. For details not disclosed in the apparatus embodiment of this application, refer to the method embodiment of this application.

Figure 8:
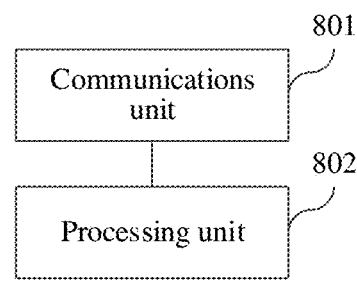
FIG. 8 is a structural block diagram of an inter-cell coordinated scheduling apparatus according to an example embodiment of this application.

FIG. 8 is a structural block diagram of an inter-cell coordinated scheduling apparatus according to an example embodiment of this application. The inter-cell coordinated scheduling apparatus may be implemented as a part or all of a network control device by using a hardware circuit or a combination of software and hardware, and the network control device may be the first network control device 120 or the second network control device 140 in the embodiment shown in the foregoing FIG. 1. The inter-cell coordinated scheduling apparatus may include a communications unit 801 and a processing unit 802.

When the network control device is implemented as the first network control device 120 in the system shown in the foregoing FIG. 1, the communications unit 801 is configured to implement functions about receiving a CoMP pre-scheduling request, sending an inter-cluster pre-scheduling request, receiving a resource allocation indication, and sending a CoMP pre-scheduling result in the embodiment shown in the foregoing FIG. 3. The processing unit 802 is configured to implement functions about determining a second edge cell, determining a first reserved resource, recycling an unused resource, assigning a second coordination cell set, and performing CoMP pre-scheduling on each cell in the second coordination cell set in the embodiment shown in the foregoing FIG. 3.

When the network control device is implemented as the second network control device 140 in the system shown in the foregoing FIG. 1, the communications unit 801 is configured to implement functions about receiving an inter-cluster pre-scheduling request, sending a CoMP pre-scheduling result, and sending a resource allocation indication in the embodiment shown in the foregoing FIG. 3. The processing unit 802 is configured to implement functions about assigning a first coordination cell set, performing CoMP pre-scheduling on each cell in the first coordination cell set, and determining an actually used resource in the first reserved resource in the embodiment shown in the foregoing FIG. 3.

When the network control device is implemented as the first network control device 120 in the system shown in the foregoing FIG. 1, the communications unit 801 may be further configured to implement functions about receiving a CoMP pre-scheduling request and sending a CoMP pre-scheduling result in the embodiment shown in the foregoing FIG. 6. The processing unit 802 may be further configured to implement functions about assigning a coordination cell set and performing CoMP pre-scheduling on each cell in the coordination cell set in the embodiment shown in the foregoing FIG. 6.

It should be noted that, when the inter-cell coordinated scheduling apparatus provided in the foregoing embodiment performs gesture recognition, only assigning of the foregoing functional units is used as an example for description. In actual application, the foregoing functions may be allocated to different functional units for implementation based on a requirement, that is, an internal structure of a device is assigned into different functional units, to implement all or some of the functions described above. In addition, the inter-cell coordinated scheduling apparatus provided in the foregoing embodiment and the method embodiment of the inter-cell coordinated scheduling method belong to a same concept. For a specific implementation process of the apparatus, refer to the method embodiment. Details are not described herein again.

The sequence numbers of the foregoing embodiments of this application are merely for illustrative purposes, and are not intended to indicate priorities of the embodiments.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

Specifically, an embodiment of this application provides a computer-readable storage medium. The computer-readable storage medium stores an instruction, and a processor executes the instruction, so that the processor implements all or some of the steps performed by the first network control device or the second network control device in the foregoing inter-cell coordinated scheduling method.

The foregoing descriptions are merely optional embodiments of this application, but are not intended to limit this application. Any modification, equivalent replacement, or improvement made without departing from the spirit and principle of this application should fall within the protection scope of this application.

What is claimed is:

1. A device comprising:
   a communications interface; and
   a processor configured to:
   control the communications interface to receive a plurality of coordinated multiple points (CoMP) pre-scheduling requests, each of at least one first CoMP pre-scheduling requests of the plurality of CoMP pre-scheduling request corresponding to at least one edge cell, a second CoMP pre-scheduling requests of the plurality of CoMP pre-scheduling requests corresponding to a first edge cell, the at least one edge cell belongs to a CoMP cluster corresponding to the device, the first edge cell is adjacent to the at least one edge cell, and the first edge cell does not belong to the CoMP cluster corresponding to the device; and
   when determining, based on the plurality of CoMP pre-scheduling requests, that the at least one edge cell comprises a second edge cell that meets a preset condition with the first edge cell, control the communications interface to send an inter-cluster pre-scheduling request to a second network control device, the inter-cluster pre-scheduling request instruct the second network control devices to assign a first coordination cell set, and the first coordination cell set comprises the first edge cell and the second edge cell.

2. The device according to claim 1, wherein the plurality of CoMP pre-scheduling requests comprises first radio environment information of an accessed terminal in the first edge cell, first weight information of the accessed terminal in the first edge cell, second radio environment information of an accessed terminal in the second edge cell, and second weight information of the accessed terminal in the second edge cell, the first radio environment information indicates signal quality detected by a corresponding terminal of each surrounding cell to the first edge cell, the first weight information comprises a current to-be-transmitted data volume or a current scheduling priority of the accessed terminal in the first edge cell, the second radio environment information indicates signal quality detected by a corresponding terminal of each surrounding cell to the second edge cell, the second weight information comprises a current to-be-transmitted data volume or a current scheduling priority of the accessed terminal in the second edge cell, and before controlling the communications interface to send the inter-cluster pre-scheduling request to the second network control device, the processor is further configured to:
  calculate, based on the first radio environment information and the first weight information, a first coordination gain of adjacent cells to the first edge cell, wherein the first coordination gain indicates an effect of coordinated transmission performed by a respective adjacent cell on the accessed terminal in the first edge cell;
  calculate, based on the second radio environment information of and the second weight information, a second coordination gain brought by adjacent cells to the second edge cell, wherein the second coordination gain indicates an effect of coordinated transmission performed by a respective adjacent cell on the accessed terminal in the second edge cell; and
  when an affinity condition is met between the first coordination gain and the second coordination gain, determine that the preset condition is met between the first edge cell and the second edge cell.

3. The device according to claim 2, wherein the affinity condition comprises:
  a coordination gain brought by the second edge cell to the first edge cell is greater than a coordination gain brought by adjacent cells in a same cluster of the first edge cell to the first edge cell, and a coordination gain brought by the first edge cell to the second edge cell is greater than the coordination gain brought by adjacent cells in a same cluster of the second edge cell to the second edge cell; or
  the coordination gain brought by the second edge cell to the first edge cell is greater than a larger value of a first preset gain or the coordination gain brought by adjacent cells in a same cluster of the first edge cell to the first edge cell, and the coordination gain brought by the first edge cell to the second edge cell is greater than a larger value of a second preset gain or the coordination gain brought by adjacent cells in a same cluster of the second edge cell to the second edge cell.

4. The device according to claim 2, wherein the first radio environment information or the second radio environment information comprises:
  a channel quality indicator CQI detected by a corresponding terminal and of each surrounding cell, a signal-to-noise ratio detected by the corresponding terminal and of each surrounding cell, or signal strength detected by the corresponding terminal and of each surrounding cell.

5. The device according to claim 1, wherein before controlling the communications interface to send the inter-cluster pre-scheduling request to the second network control device, the processor is further configured to:
  determine a first reserved resource, wherein the first reserved resource is reserved for the first edge cell and the second edge cell to perform scheduling; and
  when controlling the communications interface to send the inter-cluster pre-scheduling request to the second network control device, send the inter-cluster pre-scheduling request comprising the first reserved resource to the second network control device.

6. The device according to claim 5, wherein when determining the first reserved resource, the processor is configured to:
  determine a start resource location of the first reserved resource based on an identifier of the first edge cell and an identifier of the second edge cell;
  determine a quantity of resources of the first reserved resource based on resource requirement information of an accessed terminal in the first edge cell and resource requirement information of an accessed terminal in the second edge cell, wherein the resource requirement information of the accessed terminal in the first edge cell comprises a current to-be-transmitted data volume of the accessed terminal in the first edge cell, a current scheduling priority of the accessed terminal in the first edge cell, or radio environment information of the accessed terminal in the first edge cell; and
  determine the first reserved resource based on the start resource location of the first reserved resource and the quantity of resources of the first reserved resource.

7. The device according to claim 5, wherein the processor is further configured to:
  control the communications interface to receive a resource allocation indication sent by the second network control device, wherein the resource allocation indication indicates an unused resource other than a used resource in the first reserved resource, the used resource is used by the second network control device when the second network control device performs the CoMP pre-scheduling on each cell in the first coordination cell set; and
  recycle the unused resource in the first reserved resource based on the resource allocation indication.

8. The device according to claim 5, wherein a used resource of the second edge cell only belongs to a coordination cell set in which the second edge cell is located.

9. The device according to claim 1, wherein the CoMP cluster corresponding to the device comprises at least two cells managed by the device when the device performs CoMP pre-scheduling, the at least two cells comprise the at least one edge cell, and the least one edge cell is adjacent to a cell in another CoMP cluster different from the CoMP cluster in which the at least one edge cell is located.

10. The device according to claim 9, wherein the processor is further configured to:
  assign another cell into at least one second coordination cell set based on a CoMP pre-scheduling request corresponding to the another cell, the another cell is in the at least two cells and is different from the second edge cell; and
  control, based on the second coordination cell set, the communications interface to send a CoMP pre-scheduling result.

11. The device according to claim 10, wherein the processor is configured to:
  assign the another cell into the second coordination cell set within a current transmission time interval (TTI) based on the CoMP pre-scheduling request corresponding to the another cell, the another cell is different from the first edge cell in the at least two cells; and
  control, based on the second coordination cell set, the communications interface to send the CoMP pre-scheduling result.

12. A device, wherein the device comprises:
a communications interface; and
a processor configured to:
  control the communications interface to receive an inter-cluster pre-scheduling request from a first network control device, wherein the inter-cluster pre-scheduling request instructs the device to assign a first coordination cell set comprising a first edge cell and a second edge cell, the second edge cell is a cell in at least one edge cell, the at least one edge cell belongs to a CoMP cluster corresponding to the first network control device, the first edge cell is adjacent to the at least one edge cell, and the first edge cell does not belong to the CoMP cluster corresponding to the first network control device;

assign the first coordination cell set based on the inter-cluster pre-scheduling request; and control, based on the first coordination cell set, the communications interface to send a CoMP pre-scheduling result.

13. The device according to claim 12, wherein the inter-cluster pre-scheduling request further comprises a first reserved resource, the first reserved resource is reserved by the first network control device for the first edge cell and the second edge cell to perform scheduling, and the processor is further configured to:

determine a used resource in the first reserved resource, wherein the used resource is by the device when the device performs CoMP pre-scheduling on each cell in the first coordination cell set.

14. The device according to claim 13, wherein when determining the used resource in the first reserved resource, the processor is configured to:

determine an intersection set of the first reserved resource and a second reserved resource as the used resource, wherein the second reserved resource is reserved by the first network control device for the first edge cell and the second edge cell to perform scheduling.

15. The device according to claim 13, wherein the processor is further configured to:

control the communications interface to send a resource allocation indication to the first network control device, wherein the resource allocation indication indicates an unused resource in the first reserved resource other than the used resource.

16. The device according to claim 12, wherein when assigning the first coordination cell set based on the inter-cluster pre-scheduling request, the processor is configured to:

assign the first coordination cell set within a current transmission time interval (TTI) based on the inter-cluster pre-scheduling request.

17. A method, comprising:

obtaining, by a first network control device, a plurality of coordinated multiple points (CoMP) pre-scheduling requests, each of at least one first CoMP pre-scheduling requests of the plurality of CoMP pre-scheduling requests corresponding to at least one edge cell, a second CoMP pre-scheduling request of the plurality of CoMP pre-scheduling requests corresponding to a first edge cell, wherein the at least one edge cell belongs to a CoMP cluster corresponding to the first network control device, the first edge cell is adjacent to the at least one edge cell, and the first edge cell does not belong to the CoMP cluster corresponding to the first network control device; and when the first network control device determines, based on the plurality of CoMP pre-scheduling requests, that the at least one edge cell comprises a second edge cell that meets a preset condition with the first edge cell, sending an inter-cluster pre-scheduling request to a second network control device, wherein the inter-cluster pre-scheduling request instructs the second network control device to assign a first coordination cell set, and the first coordination cell set comprises the first edge cell and the second edge cell.

18. The method according to claim 17, wherein the CoMP cluster corresponding to the first network control device comprises at least two cells managed by the first network control device when the first network control device performs CoMP pre-scheduling, the at least two cells comprise the at least one edge cell, and the least one edge cell is adjacent to a cell in another CoMP cluster different from the CoMP cluster in which the at least one edge cell is located.

19. The method according to claim 17, wherein the plurality of CoMP pre-scheduling requests comprises first radio environment information of an accessed terminal in the first edge cell, first weight information of the accessed terminal in the first edge cell, second radio environment information of an accessed terminal in the second edge cell, and second weight information of the accessed terminal in the second edge cell, the first radio environment information indicates signal quality detected by a corresponding terminal of each surrounding cell to the first edge cell, the first weight information comprises a current to-be-transmitted data volume or a current scheduling priority of the accessed terminal in the first edge cell, the second radio environment information indicates signal quality detected by a corresponding terminal of each surrounding cell to the second edge cell, the second weight information comprises a current to-be-transmitted data volume or a current scheduling priority of the accessed terminal in the second edge cell, and before the first network control device sends the inter-cluster pre-scheduling request to the second network control device, the method further comprises:

calculating, by the first network control device based on the first radio environment information and the first weight information, a first coordination gain of adjacent cells to the first edge cell, wherein the first coordination gain indicates an effect of coordinated transmission performed by a respective adjacent cell on the accessed terminal in the first edge cell;

calculating, by the first network control device based on the second radio environment information of and the second weight information, a second coordination gain brought by adjacent cells to the second edge cell, wherein the second coordination gain indicates an effect of coordinated transmission performed by a respective adjacent cell on the accessed terminal in the second edge cell; and when an affinity condition is met between the first coordination gain and the second coordination gain, determine, by the first network control device, that the preset condition is met between the first edge cell and the second edge cell.

20. The method according to claim 19, wherein the affinity condition comprises:

a coordination gain brought by the second edge cell to the first edge cell is greater than a coordination gain brought by adjacent cells in a same cluster of the first edge cell to the first edge cell, and a coordination gain brought by the first edge cell to the second edge cell is greater than the coordination gain brought by adjacent cells in a same cluster of the second edge cell to the second edge cell; or the coordination gain brought by the second edge cell to the first edge cell is greater than a larger value of a first preset gain or the coordination gain brought by adjacent cells in a same cluster of the first edge cell to the first edge cell, and the coordination gain brought by the first edge cell to the second edge cell is greater than a larger value of a second preset gain or the coordination gain brought by adjacent cells in a same cluster of the second edge cell to the second edge cell.

* * * * *